Dec. 25, 1945. S. W. AVIS 2,391,378
BUTTON WINDING MACHINE
Filed May 19, 1943 18 Sheets-Sheet 1

Dec. 25, 1945.　　　　　S. W. AVIS　　　　　2,391,378
BUTTON WINDING MACHINE
Filed May 19, 1943　　　　18 Sheets-Sheet 7

INVENTOR:
Samuel W. Avis, Dec'd.
by Harriette M. Avis, Administratrix,
by Dike, Calver & Porter
Attys.

Dec. 25, 1945.  S. W. AVIS  2,391,378
BUTTON WINDING MACHINE
Filed May 19, 1943  18 Sheets-Sheet 8

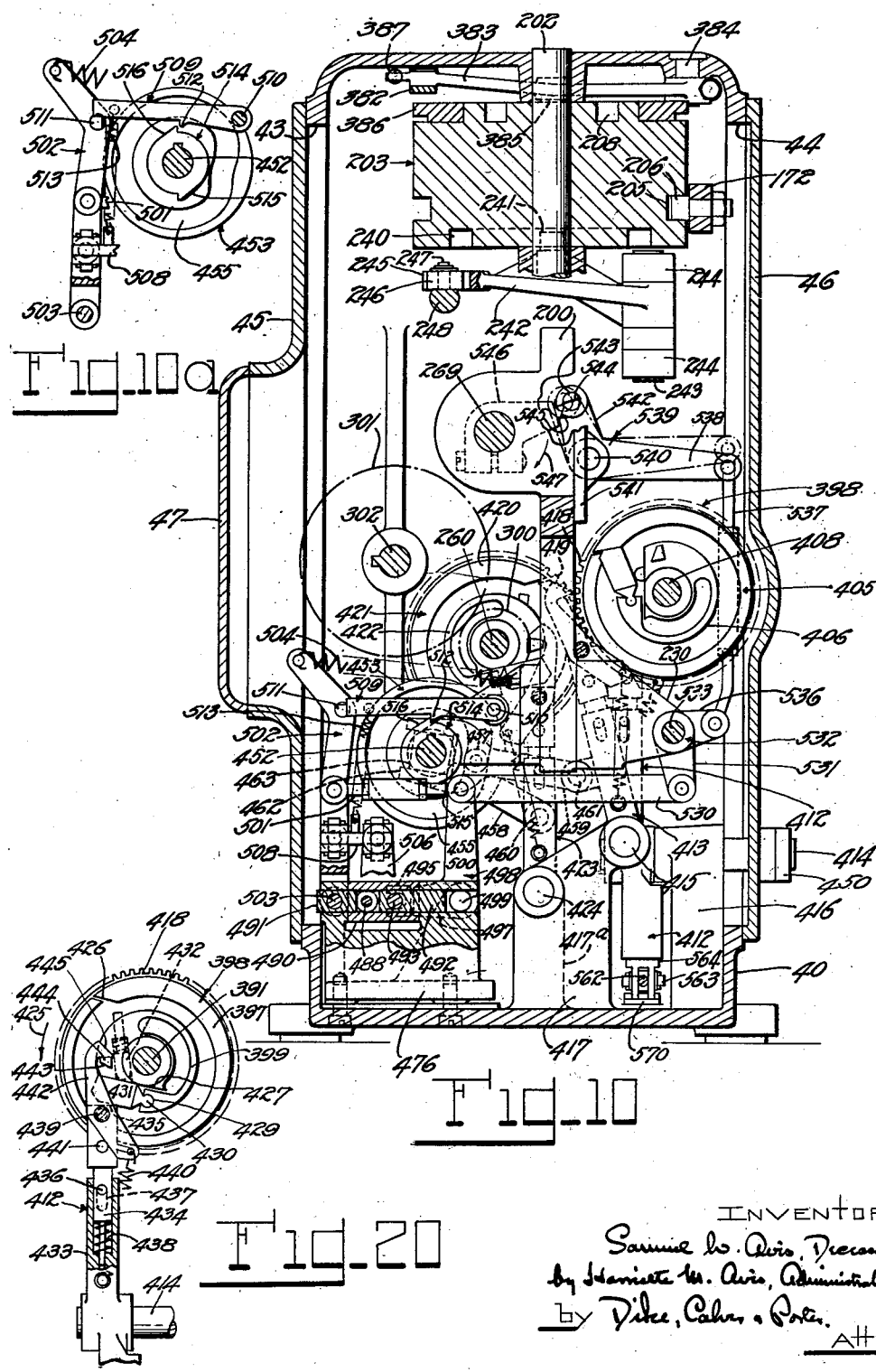

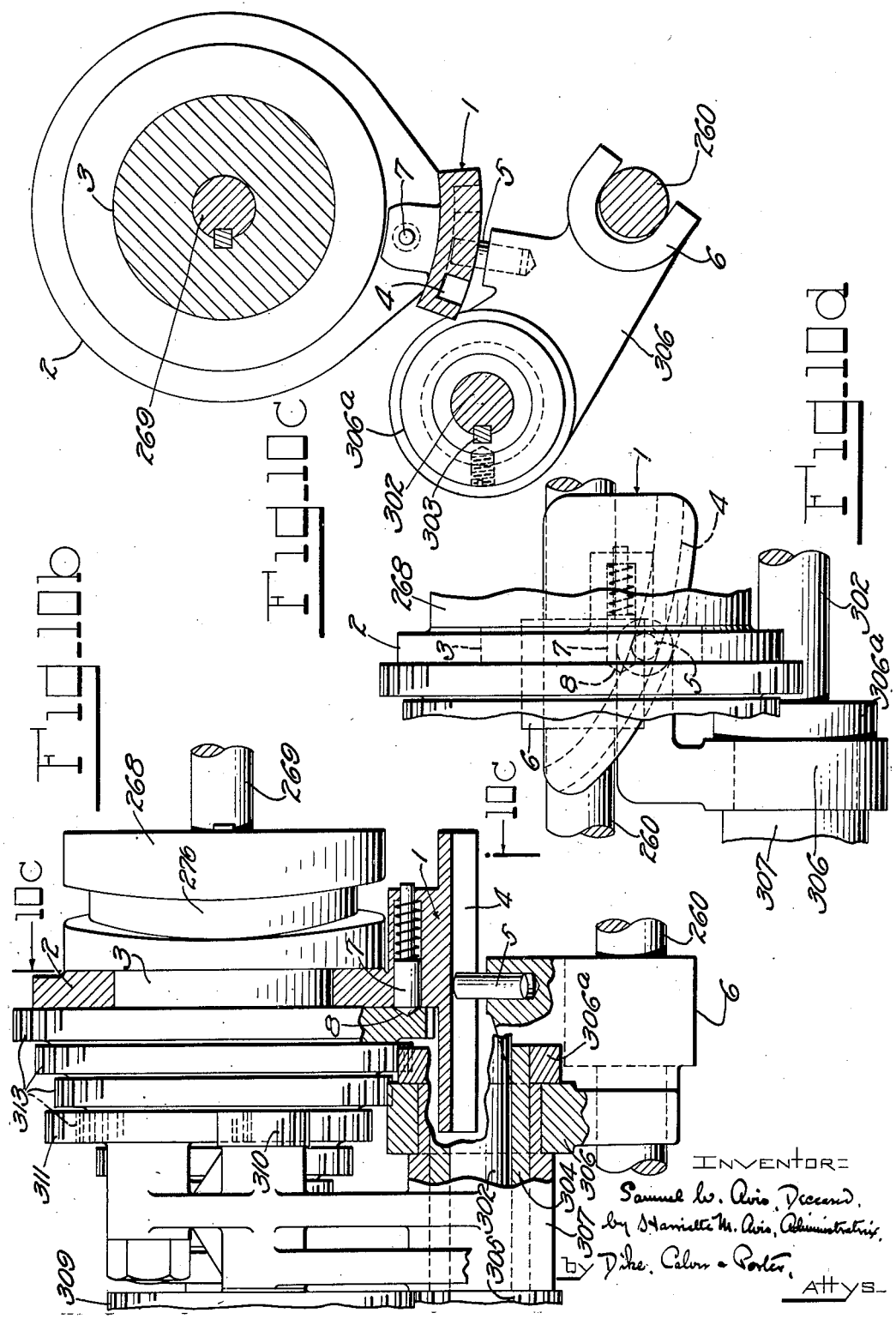

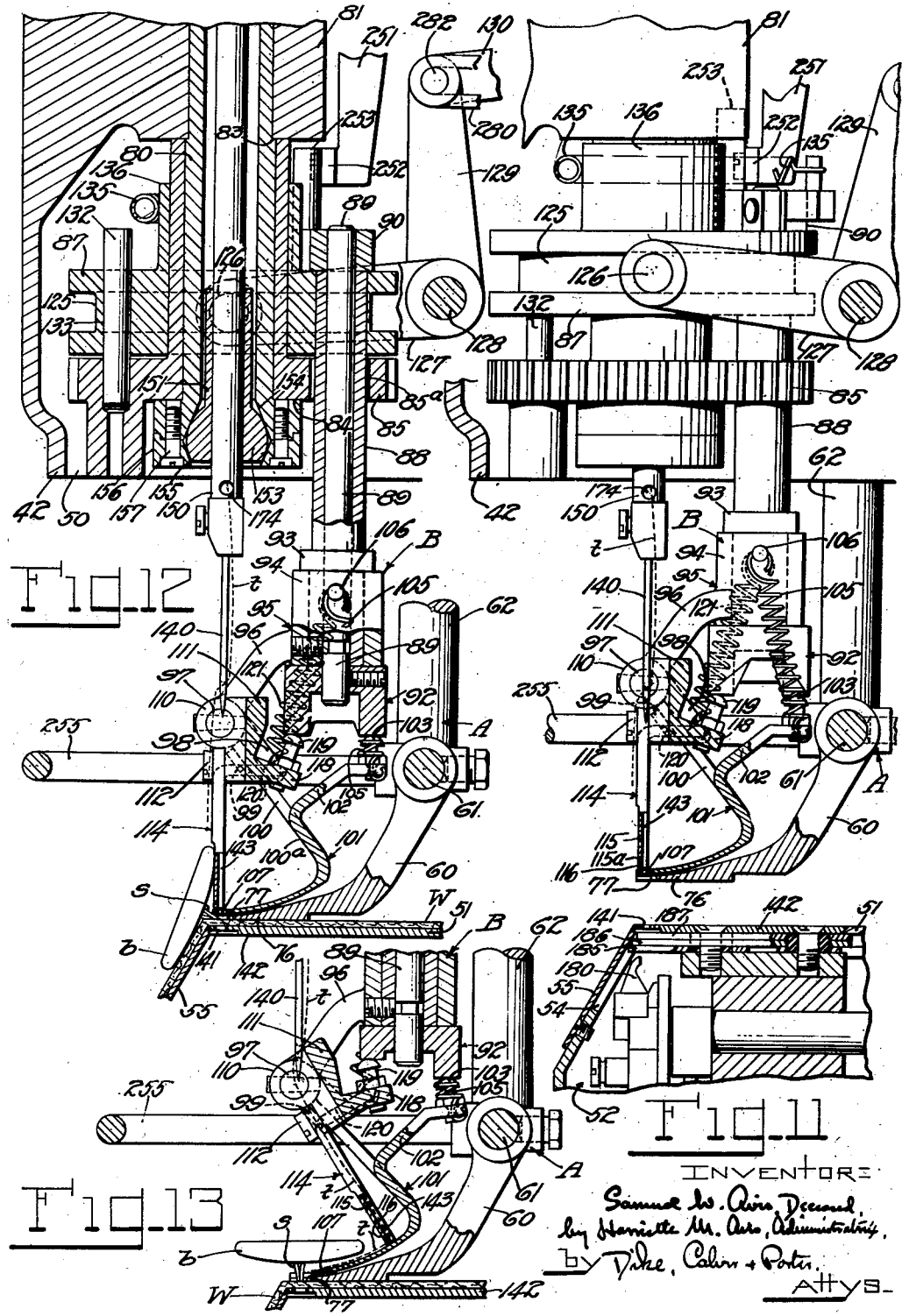

Dec. 25, 1945.  S. W. AVIS  2,391,378
BUTTON WINDING MACHINE
Filed May 19, 1943  18 Sheets-Sheet 13

INVENTOR:
Samuel W. Avis, Deceased,
by Harriette M. Avis, Administratrix,
by Dike, Calver & Porter
Attys.

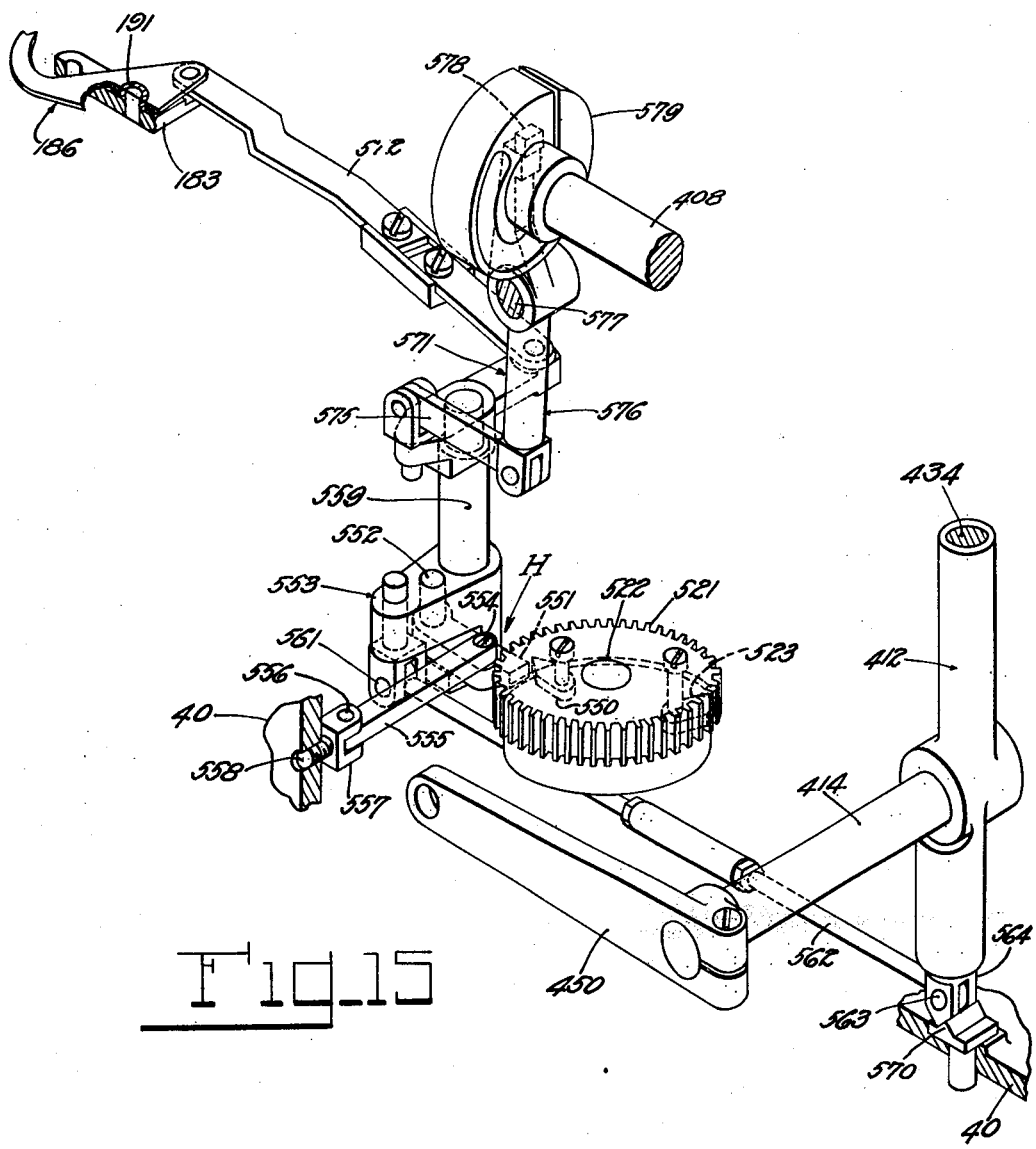

Dec. 25, 1945. S. W. AVIS 2,391,378
BUTTON WINDING MACHINE
Filed May 19, 1943 18 Sheets-Sheet 15

INVENTOR:
Samuel W. Avis, Dec'd.,
by Harriette M. Avis, Administratrix
by Dike, Calver & Porter
Attys.

Dec. 25, 1945. S. W. AVIS 2,391,378
BUTTON WINDING MACHINE
Filed May 19, 1943 18 Sheets-Sheet 16
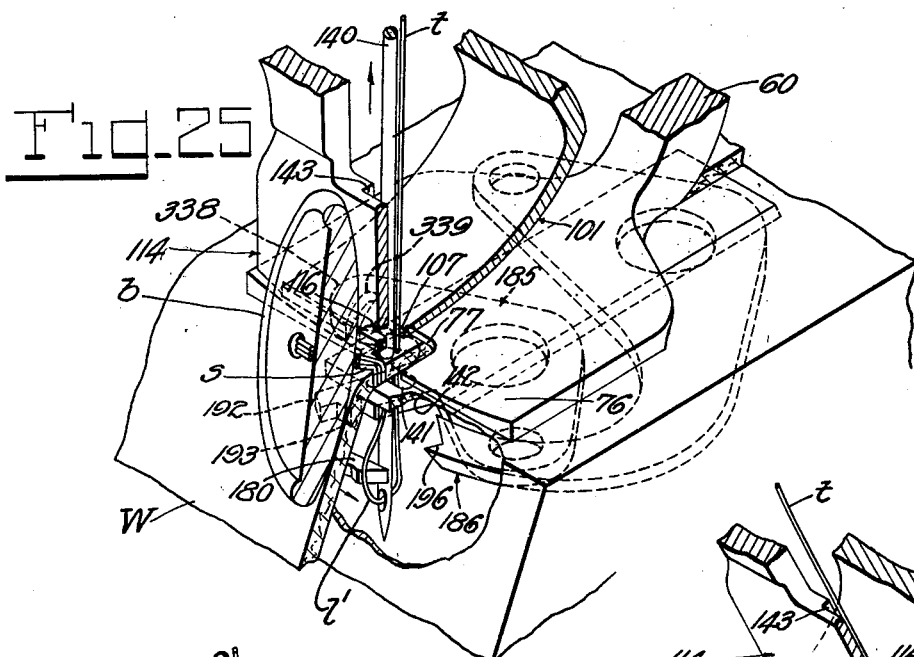

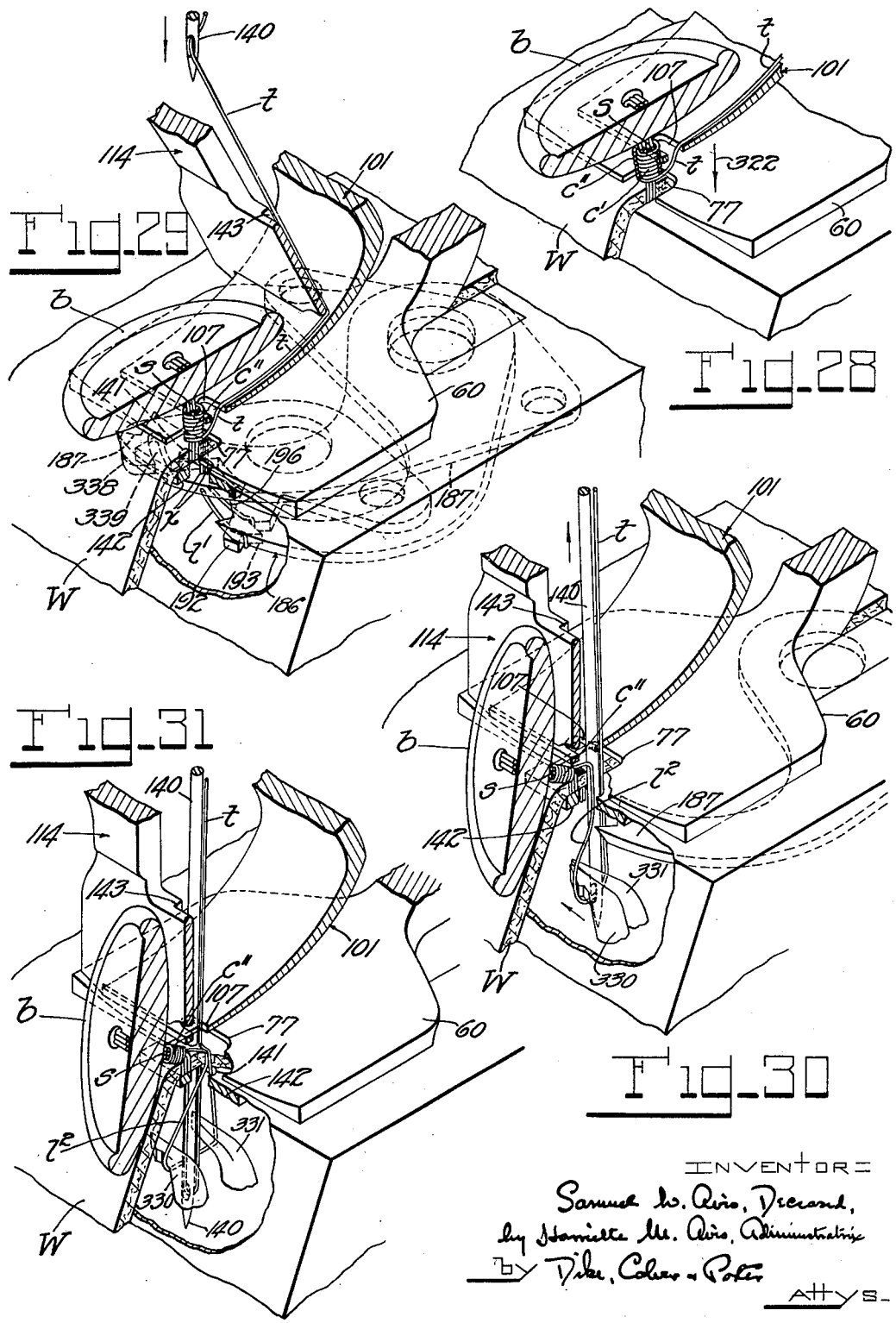

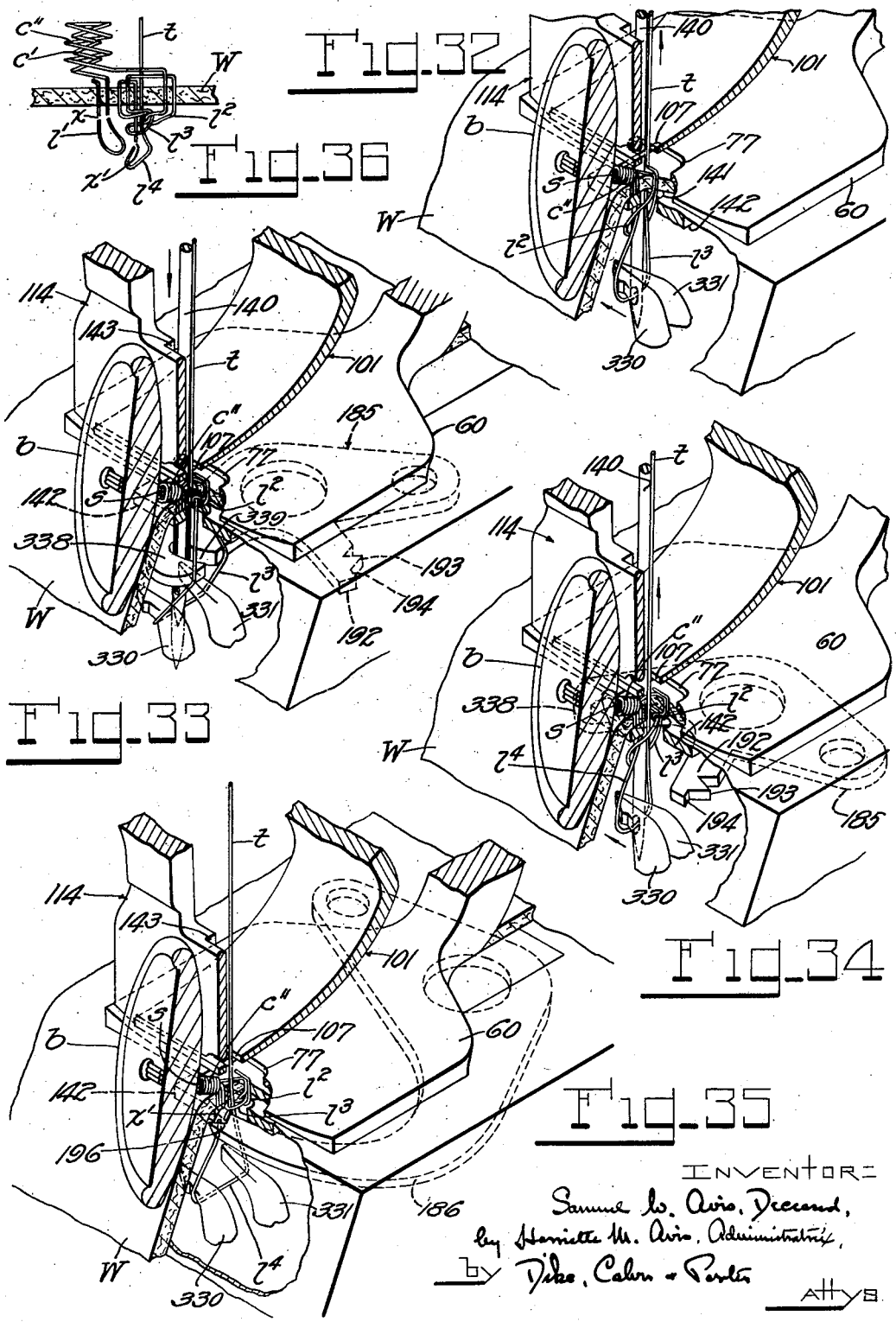

Patented Dec. 25, 1945

2,391,378

UNITED STATES PATENT OFFICE 2,391,378

BUTTON WINDING MACHINE

Samuel W. Avis, deceased, late of Wellesley, Mass., by Harriette M. Avis, administratrix, Wellesley, Mass., assignor to The Reece Button Hole Machine Company, Boston, Mass., a corporation of Maine Application May 19, 1943, Serial No. 487,568

64 Claims. (Cl. 112—110)

This invention relates to button winding machines and more particularly to a machine which winds a number of turns of a winding thread on or about the customary thread shank by which a button is attached to a fabric or other material, and which securely anchors the leading and trailing ends of the thread windings in the fabric underneath the button.

In commercial practice a button is secured to a fabric most efficiently by a button sewing machine in which the button is usually held somewhat above the fabric to leave an appropriate space between the button and that portion of the fabric to which it is attached, so that the fabric about the buttonhole will be received underneath the button without becoming puckered and the buttonhole will not be appreciably distorted and rapidly worn. The thread shank which connects the button with the fabric is thus formed of a number of loosely bunched thread lengths which permit the button to droop on the fabric in an unsightly fashion and are readily chafed and soon broken by the sewed edges of the buttonhole. In order to protect the thread shank against the chafing action of the buttonhole edges and to stay the thread shank, it is customary to wind a thread rather tightly about the thread shank. This is frequently done by hand, but this practice is too inefficient for commercial purposes. A few machines for winding a thread on a thread shank have been designed in the past, but these machines have a number of defects and have so far as known never been commercially successful. None of these prior machines is capable of winding a thread on a shank sufficiently tight to compare favorably with a hand winding, without pulling the leading end of the winding thread from its anchorage or without twisting the shank to such an extent that the same is considerably shortened. It is another glaring defect of the prior machines that they wind thread on a thread shank without supporting the button in any way or without compelling the windings to proceed along the shank, or both, with the result that the windings pile up on a portion only of the shank and leave the rest of the shank free to droop and exposed to the chafing action of the buttonhole edges. Work placed in the prior machines is furthermore so hidden behind moving machine parts that it is difficult for an operator to inspect the work while being operated on, thereby complicating the accurate timing of these machines as well as the detection of the cause of faulty performance of the same. The prior machines are also impractical as far as the secure anchorage of the leading and trailing ends of the thread windings are concerned in that they anchor these ends either insecurely or in the form of stitches in the fabric which crowd one another and form an unsightly bulge in back of the fabric.

It is the primary aim and object of the present invention to provide a button winding machine which overcomes the defects of the prior machines and is adaptable to perform on shanks and buttons of varying sizes on simple adjustment of the machine.

It is a more specific object of the present invention to firmly anchor the leading end of the winding thread and to stay a thread shank to be wound so that said thread may be wound on said shank sufficiently tight to compare favorably with a hand winding.

It is another specific object of the present invention to guide the winding thread onto the thread shank of a button from one end of said shank to the other end thereof, and to provide a support for the button so that the windings will be uniformly distributed over the entire length of the shank without interference from the button.

It is another specific object of the present invention to provide for guidance of the winding thread onto a thread shank of variable length from one end to the other end thereof, and to provide also such a support for the button on said shank that the thread windings will be uniformly distributed over the entire shank regardless of the length of the latter.

It is another specific object of the present invention to provide also for variation of the number of thread windings on a shank so as to maintain their closely spaced relationship from one end to the other end of the shank regardless of the length of the latter.

It is another specific object of the present invention to anchor the leading end of the thread windings in the material underneath the button without forming stitches.

It is another specific object of the present invention to provide for ready insertion and location of the work in the machine as well as for ready inspection of the inserted work prior to and during an operation of the machine.

The invention will be best understood from the following description in conjunction with the accompanying drawings. It is to be understood that the invention is not limited to the details of construction and arrangement of parts illustrated in the drawings, since the invention, as defined by the claims hereinafter appended, may be otherwise embodied without departure from the spirit and scope thereof.

It is also to be understood that the terms here used are for the purpose of description and not of limitation, and it is not intended to limit the invention claimed herein beyond the requirements of the prior art.

In said drawings:

Fig. 1a is a fragmentary section complementary to that of Fig. 1 and showing the top of the machine.

Fig. 3 is a horizontal section through the machine, taken substantially on the line 3—3 of Fig. 1a.

Fig. 3a illustrates a part of the machine in side elevation as viewed in the direction of the arrow 3a in Fig. 3.

Figure 1:
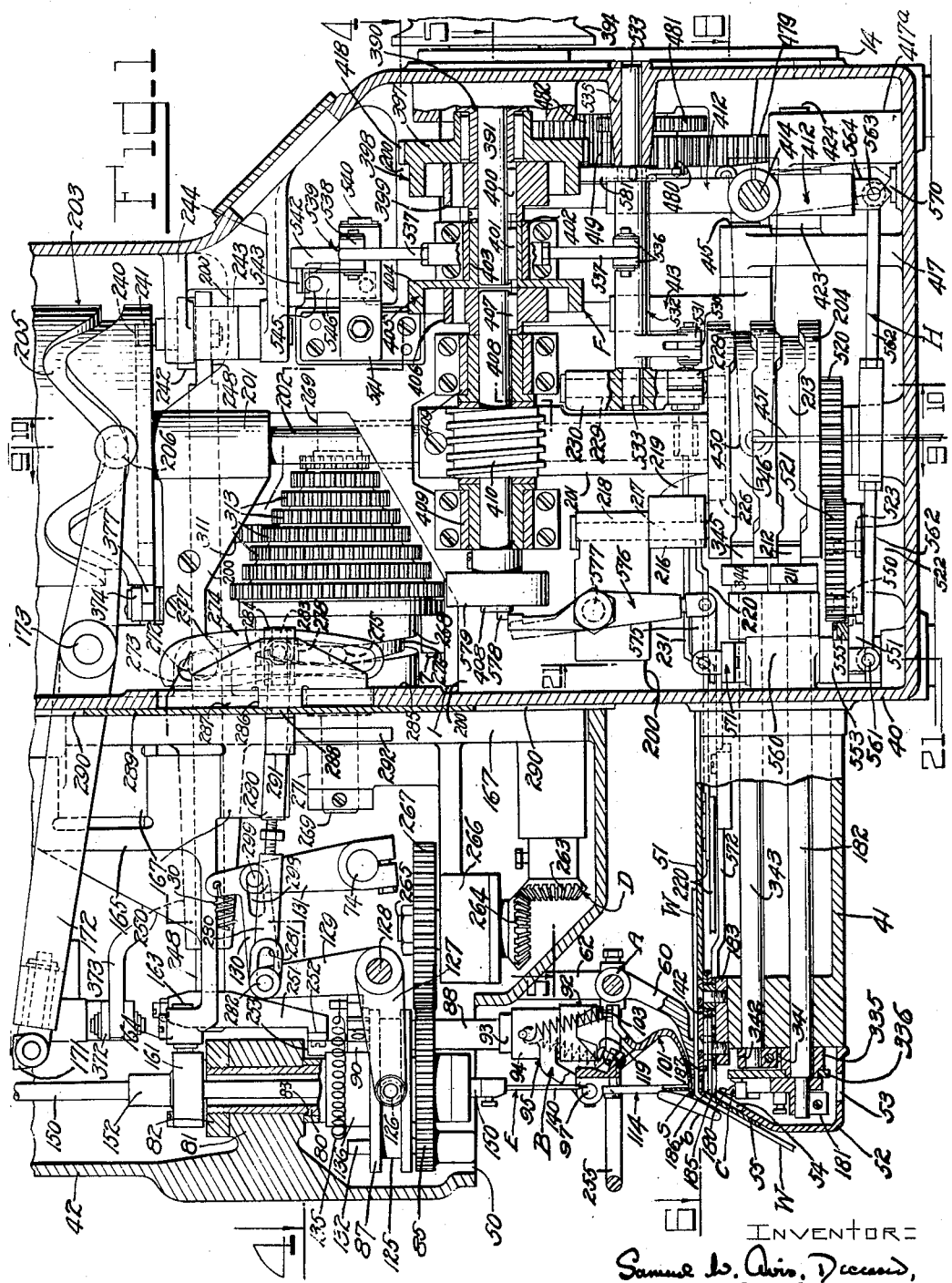
Fig. 1 is a fragmentary vertical section through a machine embodying the present invention, the section being taken substantially on the line 1—1 of Fig. 4.
Figure 4:
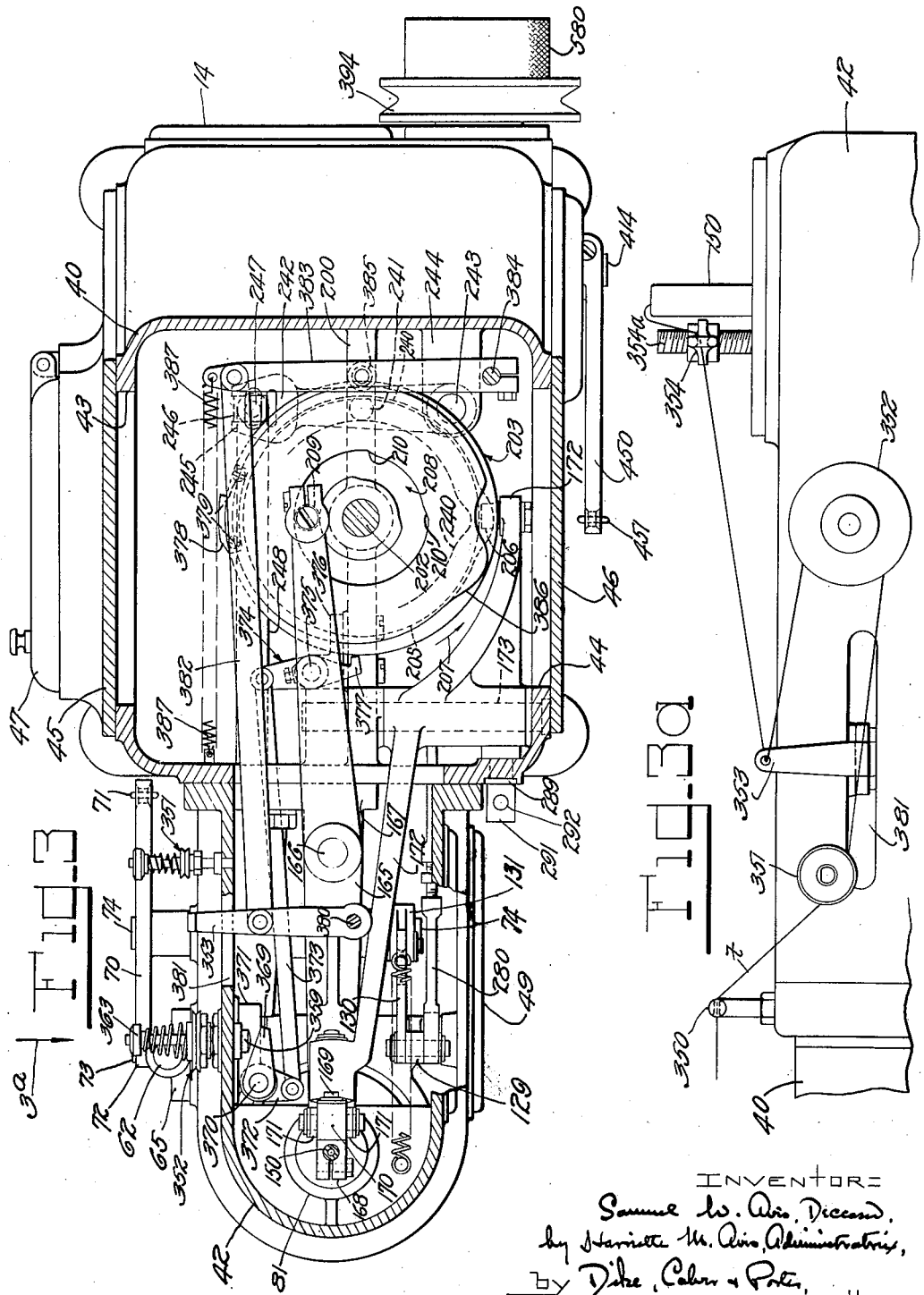
Figure 5:
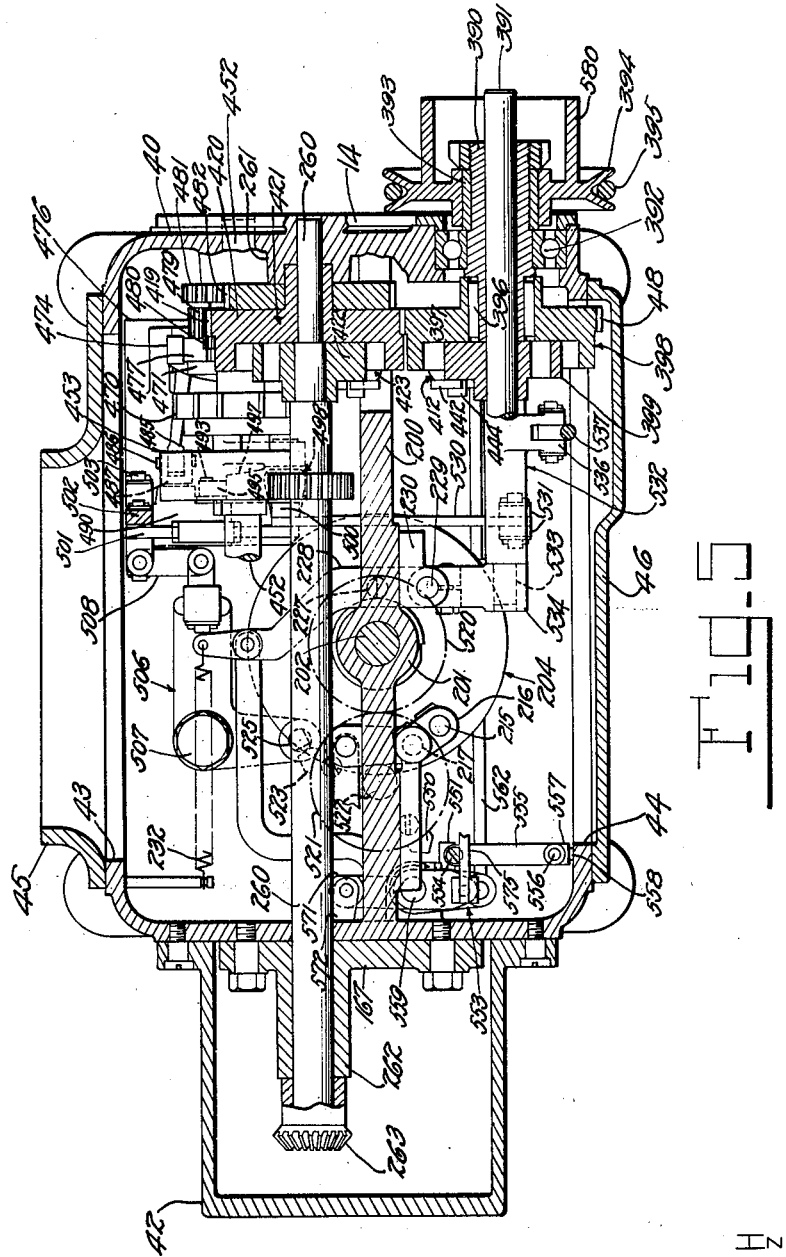
Figure 6:
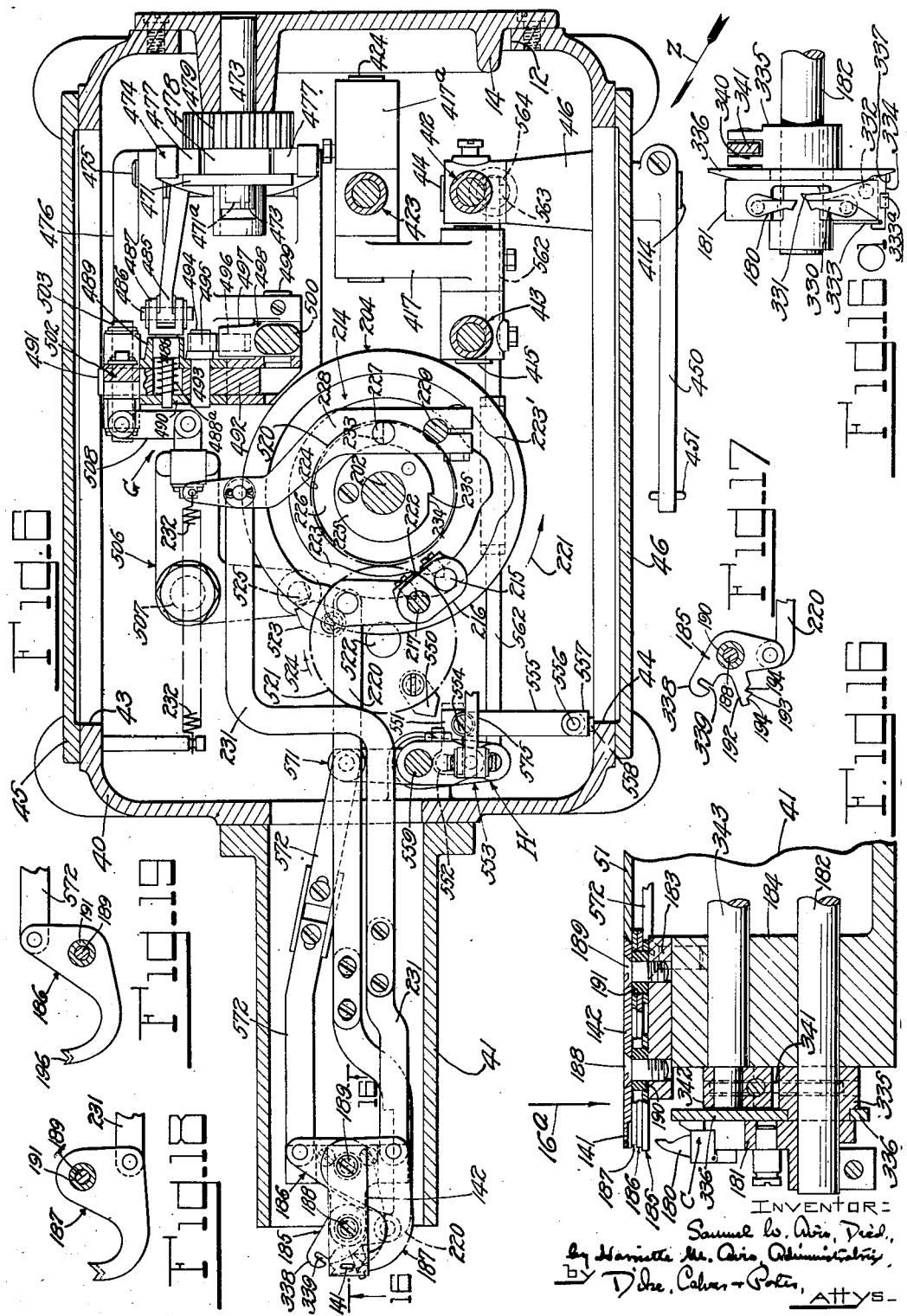

Figs. 4, 5 and 6 are horizontal sections through the machine taken substantially on the lines 4—4, 5—5 and 6—6, respectively, of Fig. 1.

Figure 7:
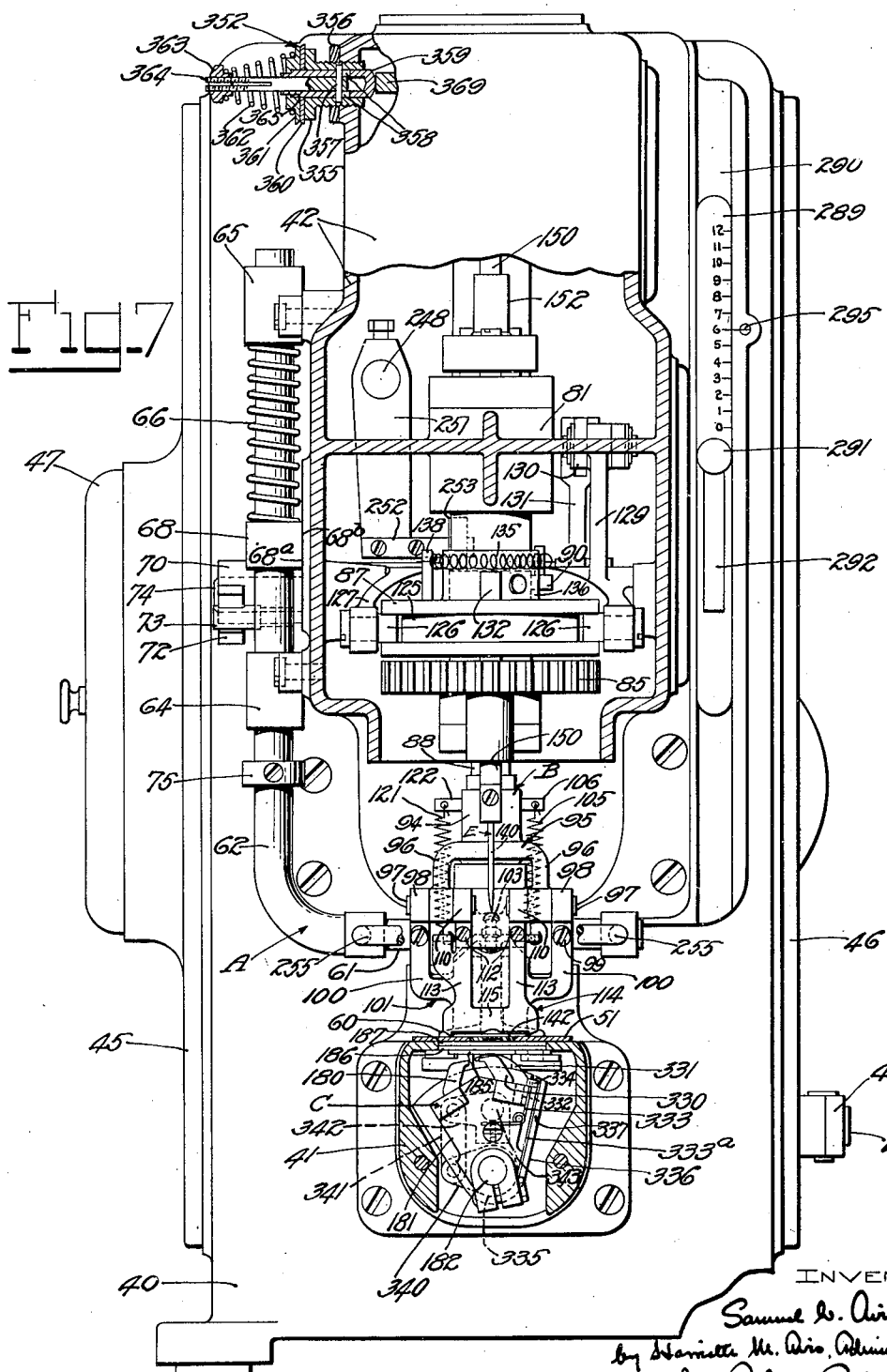

Fig. 7 is a front elevation, partly in section, of the machine.

Figure 2:
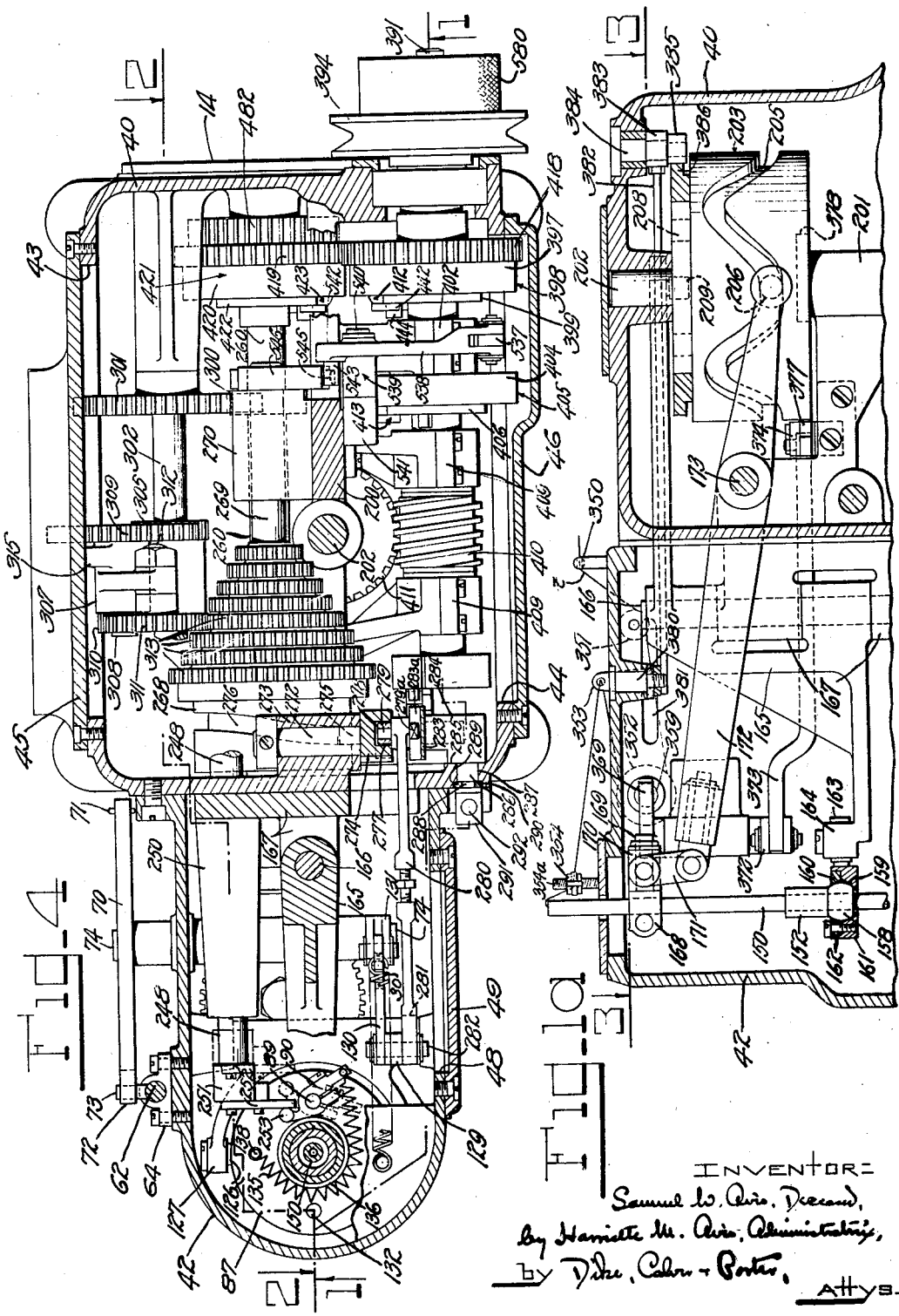
Fig. 2 is a fragmentary vertical section through the machine taken substantially on the line 2—2 of Fig. 4.
Figure 8:
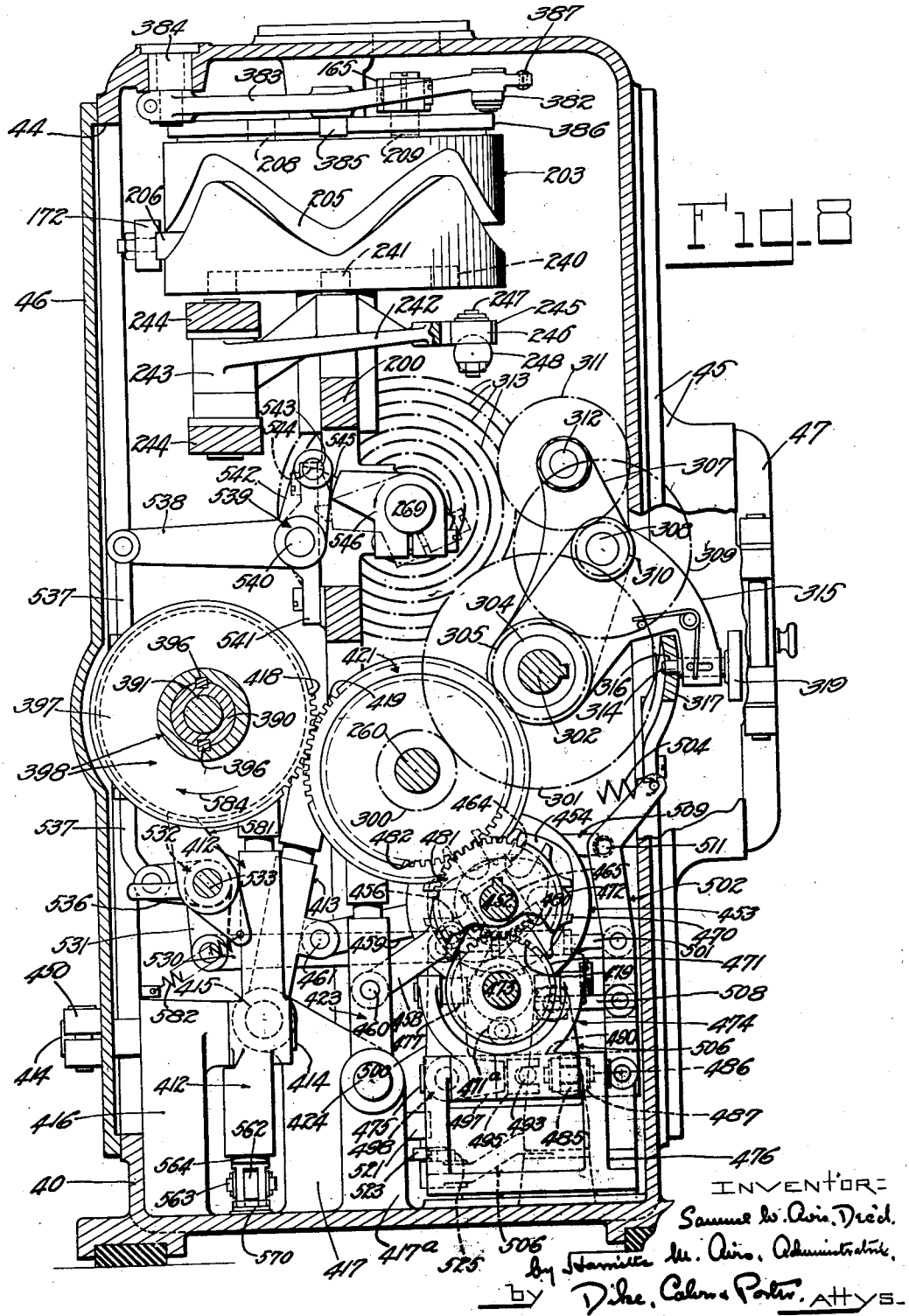

Fig. 8 is a transverse section through the machine taken substantially on the line 8—8 of Fig. 2.

Figure 9:
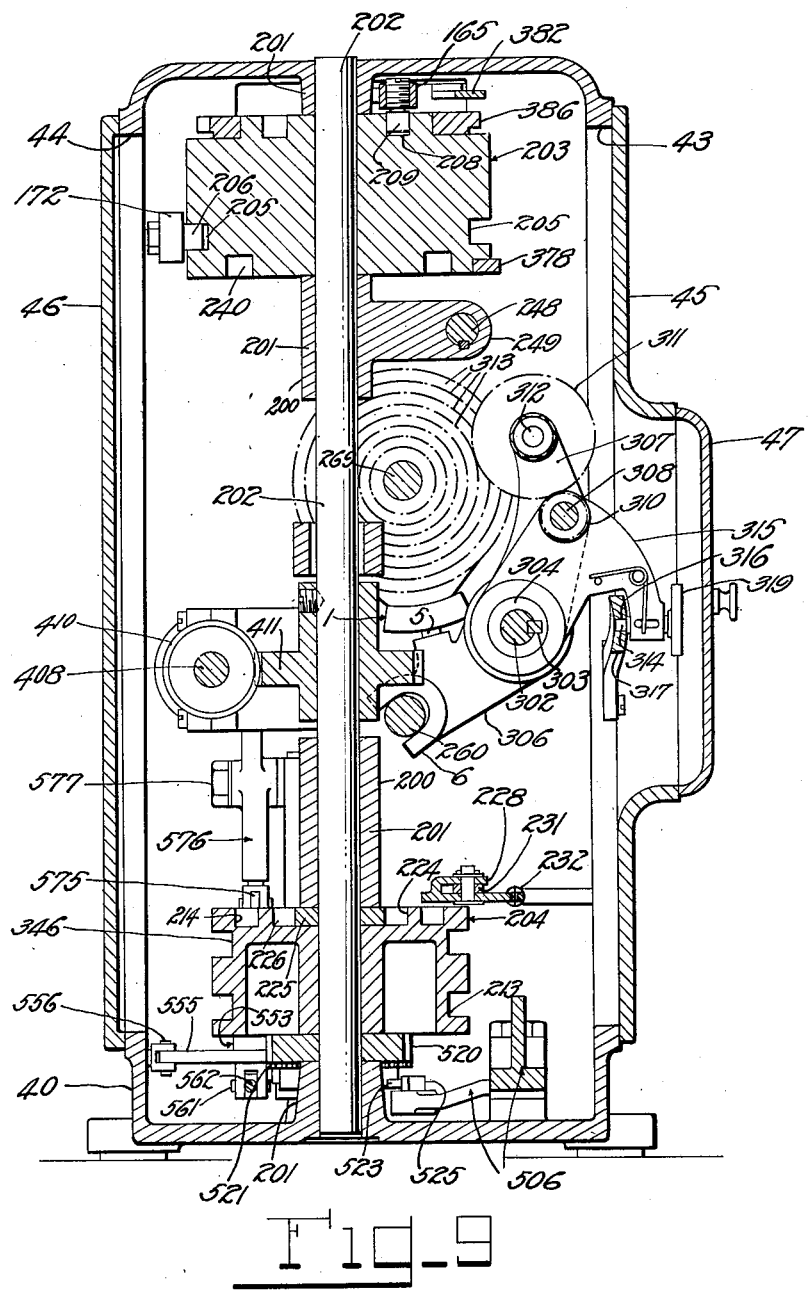

Figs. 9 and 10 are transverse sections through the machine taken substantially on the lines 9—9, and 10—10, respectively, of Fig. 1.

Fig. 10a shows certain operating parts of the machine in a certain relative operating position.

Fig. 10b is an enlarged elevational view, partly in section, of certain cooperating elements of the machine.

Fig. 10c is a section taken on the line 10c—10c of Fig. 10b.

Fig. 10d is a fragmentary plan view of certain of the cooperating elements of Fig. 10b.

Figs. 11, 12 and 13 are fragmentary sectional views, partly in elevation, of the thread handling mechanism of the machine in different positions.

Figure 14:
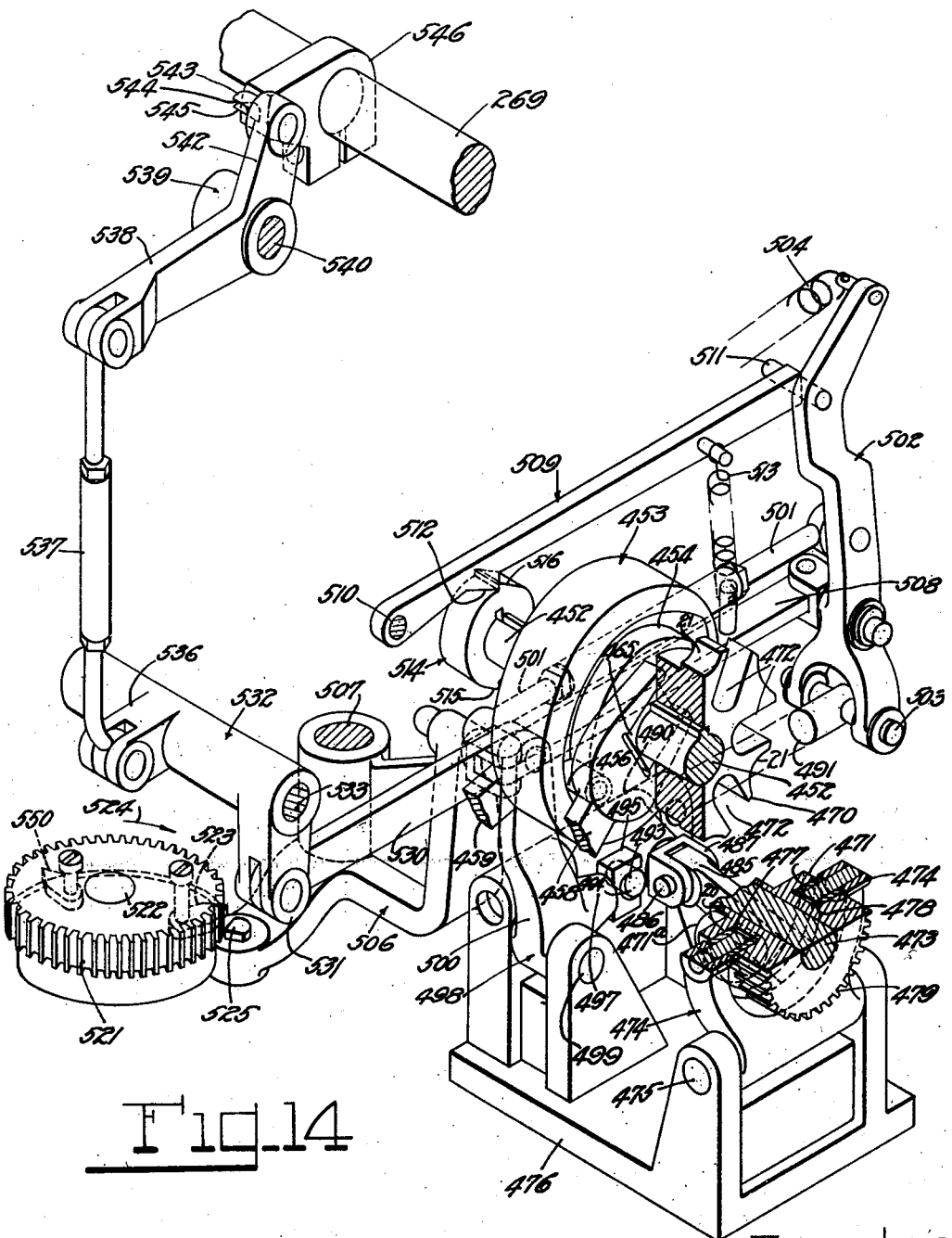

Fig. 14 is a perspective view, partly in section, of certain operating mechanism of the machine as viewed in the direction of the arrow Z in Fig. 6, the view being somewhat distorted for better illustration of the parts.

Fig. 15 is a perspective view of other operating mechanism of the machine also as viewed in the direction of the arrow Z in Fig. 6.

Fig. 16 is an enlarged section taken substantially on the line 16—16 of Fig. 6.

Fig. 16a is a fragmentary plan view of certain operating parts of the machine as viewed in the direction of the arrow 16a in Fig. 16.

Figs. 17, 18 and 19 show certain details of the machine.

Fig. 20 shows in detail one of several clutches of the machine.

Figure 21:
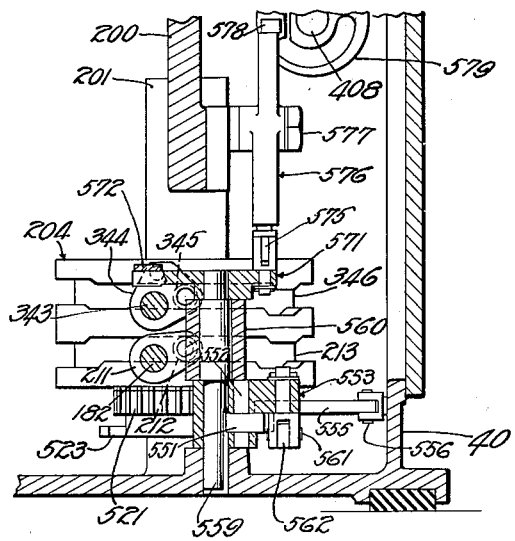

Fig. 21 is a fragmentary vertical section taken substantially on the line 21—21 of Fig. 1.

Figure 24:
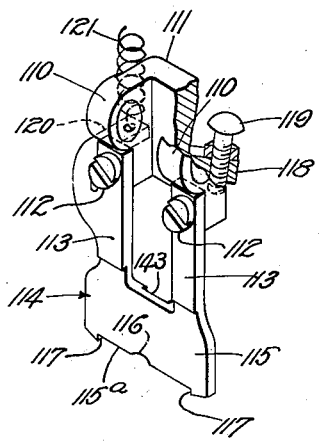
Figure 23:
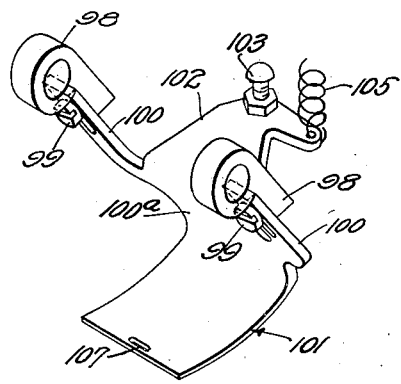
Figure 22:
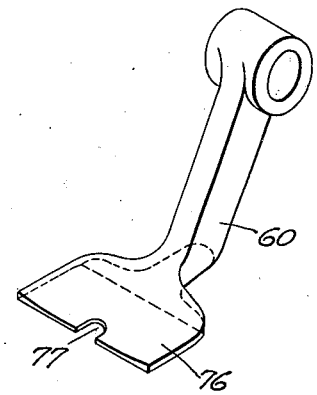

Figs. 22, 23 and 24 illustrate perspectively other details of the machine.

Figs. 25 to 35, inclusive, are fragmentary perspective views of certain cooperating parts of the thread handling mechanism, shown somewhat exaggerated to more clearly illustrate the operation of the machine in progressive steps.

Fig. 36 illustrates diagrammatically the manner in which the winding thread is handled or applied.

Referring to the drawings and particularly to Fig. 36, the present machine is designed to perform the following steps during a complete operating cycle. The leading end of a needle or winding thread $t$ is passed by a conventional needle through a suitably supported material W to which a button is attached by means of a conventional thread shank (see Fig. 25), and the thread loop $l'$ which is left behind by the needle on its following ascent is firmly anchored below the supported material. The thread $t$ passing from the needle in its uppermost position is then wound on or about the shank, first upwardly to form inner windings $c'$ (Fig. 36) and then downwardly to form outer windings $c''$ which cover the inner windings $c'$. At the end of the winding operation both legs of the anchored loop $l'$ are severed close to the material W as indicated at $x$, and the thread $t$ is thereafter anchored in the material in the form of an attaching stitch followed by a tying stitch. The stitches are formed in a well known manner by concatenating two successive thread loops $l^2$ and $l^3$ left behind by the needle on successive reciprocations of the same in different lateral dispositions, and then passing the needle, in the lateral disposition in which it formed the loop $l^3$, through the latter loop to form a last loop $l^4$ which is drawn tight to set the tying stitch. The thread $t$ is finally severed close to the tying stitch, as indicated at $x'$. This concludes an operating cycle of the machine.

Figure 3:
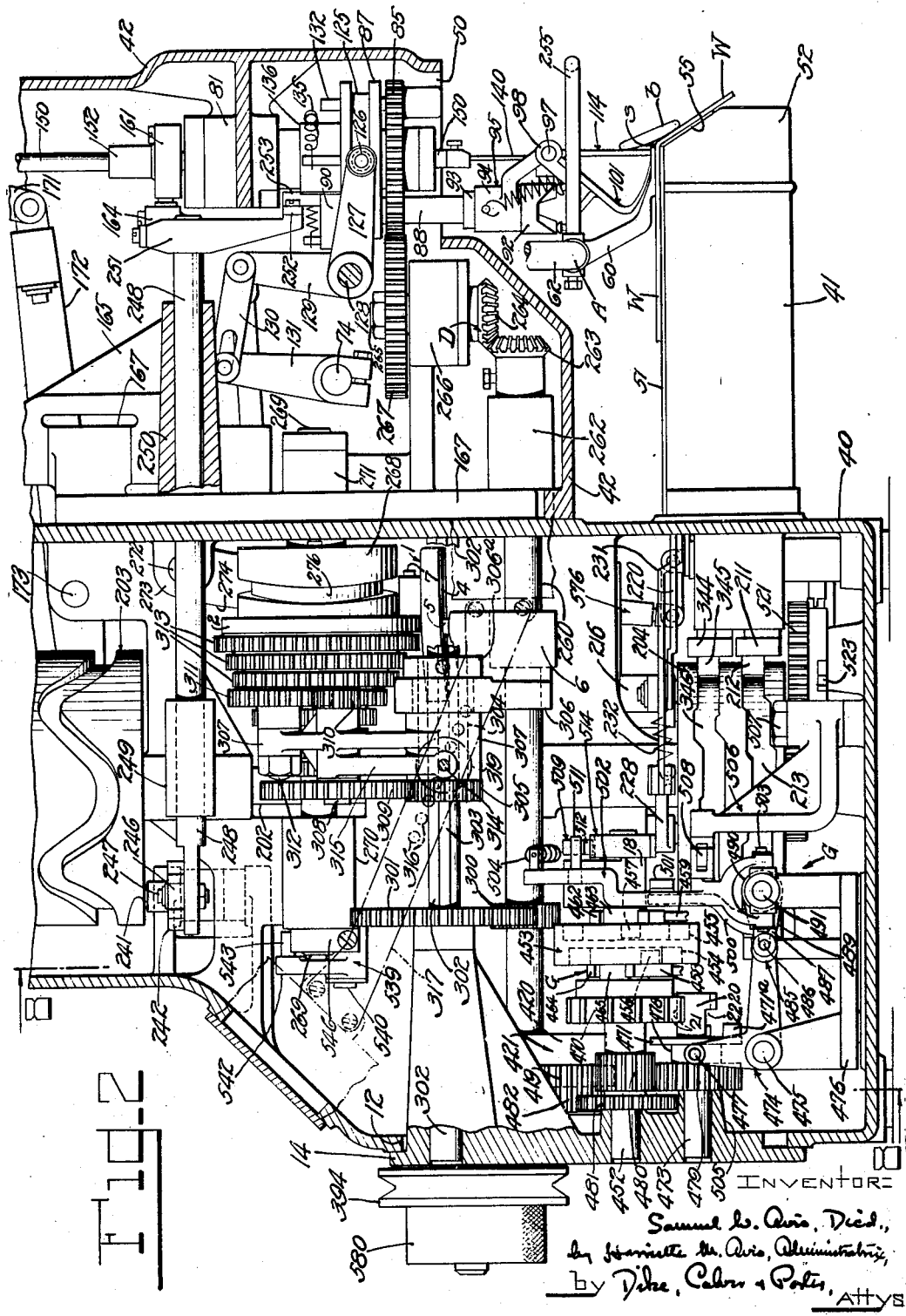

Referring to Figs. 1 to 6, the present machine comprises a frame or housing 40, a forwardly projecting horn 41 mounted on said frame, and a head 42 also mounted on the frame 40 and overhanging the horn 41. Mounted in the frame 40, horn 41 and head 42 are a plurality of operating mechanisms of the machine. The frame 40 is open at both sides for access thereto as indicated at 43 and 44, and is normally closed by removable covers 45, 46 and a hinged cover or gate 47 (Figs. 3, 9 and 10). The rear wall of the frame 40 is provided with an opening 12 which is closed by a removable cover 14 (Figs. 1, 2 and 6). The overhanging head 42 is open at one side for access thereto as indicated at 48 (Fig. 4) and is normally closed thereat by a removable cover 49. The head 42 is provided at the bottom near the front thereof with a further opening 50 (Figs. 1 and 2) through which extend certain operating parts of the machine. The horn 41 is open at the top and covered by a removable work plate 51 (Figs. 1, 2 and 7) on which the material W is supported. Located in front of the horn 41 are certain elements of a thread handling mechanism which are enclosed in a removable cover 52 and readily accessible through an opening 54 in said cover which is normally closed by a removable cover plate 55. The cover 52 is provided with another opening 53 through which may escape thread ends that have been cut off by means hereinafter described. The various operating mechanisms referred to, and hereinafter described in detail in the following order, are a work clamping mechanism A (Figs. 2 and 7), a winder head B (Figs. 1, 12 and 13), a thread-anchoring mechanism C (Figs. 1 and 7), an actuating mechanism D for the winder head (Figs. 1 and 2), a stitching mechanism E (Figs. 1 and 7), driving means F for the mechanisms C, D and E (Fig. 1), a control G for the driving means F (Figs. 2 and 6), and a stop mechanism H for the machine (Figs. 1, 6 and 15).

Work clamping mechanism A

Referring more particularly to Figs. 2, 7, 11, 12 and 22, the work clamping mechanism comprises a presser foot 60, suitably mounted on the laterally bent portion 61 of a bar 62 which is guided for vertical movement in bearing brackets 64 and 65, mounted on the machine head 42 (Fig. 7). The presser foot 60 is normally urged downwardly against the work plate 51 by means of a compression spring 66 which surrounds the bar 62 and is interposed between an adjustable collar 68 on the latter and the bearing bracket 65. The collar 68 preferably has a flat surface 68a which slides on a machined surface 68b of the machine head 42 to prevent the presser foot-carrying bar 62 from turning. In order to insert work in the machine, the presser foot 60 is raised against the compression of the spring 66, whereby it may be mentioned in advance that the overhanging winder head B is also raised (Figs. 11 and 12) in a manner described hereinafter. The presser foot 60 is raised preferably by means of a foot pedal (not shown) through intermediation of a lever 70 (Figs. 3 and 7) one end of which is connected by a chain 71 with the mentioned foot pedal and the other end of which is forked at 72 and receives a laterally projecting pin 73 on the presser foot bar 62. The lever 70 is mounted on one end of a shaft 74 which is suitably journalled in the machine head 42. The bar 62 is preferably provided with an adjustable stop collar 75 (Fig. 7) which engages the bearing bracket 64 in the uppermost position of the presser foot 60.

The presser foot 60 has a relatively thin or low toe 76 (Figs. 12 and 22) which is adapted firmly to clamp the material W underneath the button b to the work plate 51. To accomplish this, the button b is held in the tilted position shown in Fig. 12, by means described hereinafter, when the presser foot is lowered into clamping position. The forward edge of the presser foot 60 is also provided with a notch 77 (Figs. 12, 13 and 22) within which to locate the usual thread shank s by which the button b is attached to the material W.

Winder head B

Referring primarily to Figs. 1, 7, 11 and 12, the winder head comprises a sleeve 80 which is mounted in a boss 81 in the machine head 42. The upper end of the sleeve 80 is threaded and receives a nut 82 which maintains an annular shoulder 83 of said sleeve in firm engagement with the boss 81. Journalled on the sleeve 80, and held axially immovable between the boss 81 and an annular shoulder 84 on said sleeve, is the relatively long hub of a gear 85. Axially slidable on this hub is a cylindrical member 87, carrying a depending sleeve 88 which extends through an aperture 85a in the gear 85. Journalled in the sleeve 88 is a bar 89 on the upper projecting end of which is mounted a lever 90 and on the lower projecting end of which is mounted a cam 92. Suitably mounted on the sleeve 88 between a collar 93 thereon and the cam 92 is the hub 94 of a forked bracket 95 in the spaced legs 96 of which are mounted stubs 97. Journalled on those portions of the stubs 97 which project beyond the legs 96 of the bracket 95 are bearing lugs 98 (Figs. 7 and 23) to which are secured by screws 99 the spaced arms 100 of the shank 100a of a thread guide 101 which is preferably formed arcuate about the common axis of the stubs 97 as best shown in Figs. 12 and 13. The shank of the thread guide 101 is provided with a rearward extension 102 in which is received a set screw 103, adapted to cooperate with the cam 92. The rearward extension 102 of the thread guide 101 also receives one end of a tension spring 105 the other end of which is anchored on a pin 106 on the hub of the bracket 95. The spring 105 urges the set screw 103 into engagement with the cam 92. The thread guide 101 is further provided near its forward edge with an elongated slot 107 for a purpose hereinafter described. Also journalled on the stubs 97, between the spaced legs 96 of the bracket 95, are the spaced lugs 110 of a bracket 111 (Figs. 7 and 24) to which are secured by screws 112 the spaced legs 113 of a U-shaped deflector 114, the yoke 115 of which extends with its bottom edge 115a into close proximity to the thread guide 101 (Fig. 11) and is provided in the middle with a shallow notch 116 (Fig. 24) for a purpose described hereinafter. The bottom edge 115a of the deflector 114 is flanked by low shoulders 117 which are slidable on the side edges of the thread guide 101. The bracket 111 is also provided with a rearward extension 118 in which is received a set screw 119 adapted to cooperate with the cam 92. One of the legs 113 of the deflector 114 is bent rearwardly as at 120 to receive one end of a tension spring 121, the other end of which is anchored on a pin 122 on the hub of the bracket 95 (Fig. 7). The spring 121 urges the set screw 119 into engagement with the cam 92.

The winder head just described is liftable with the presser foot 60 to permit the insertion of work in the machine. To this end, the cylindrical member 87 is provided with a peripheral groove 125 (Figs. 1, 2, 7, 11 and 12), receiving opposite rollers 126 on a shifter fork 127 which is journalled on a suitably mounted shaft 128 in the machine head 42 and has an integral arm 129 which is connected by a link 130 (Figs. 1 and 2) with an arm 131, mounted on the previously mentioned rotatable shaft 74 which carries the lever 70 (Fig. 3). The axially immovable gear 85, which is adapted to rotate the winder head during a winding operation, has a driving connection with the axially slidable member 87 of the winder head in the form of a pin 132 (Fig. 12) which is mounted in the gear 85 and slidably received in a bore 133 in the member 87.

It may be stated in advance that the winder head B, when not rotated, always assumes substantially the angular position shown in Figs. 1, 7 and 11 to 13, i. e., directly above the presser foot 60. Moreover, the thread guide 101 and the deflector 114 normally assume, under the control of the cam 92, the relative "winding" position shown most clearly in Fig. 13. The cam 92 on the bar 89 is normally urged into the position shown in Fig. 13 by means of a tension spring 135 which draws the lever 90 on said bar 89 into the corresponding dot-and-dash line position (Fig. 4) in which the same is in engagement with the hub 136 of the member 87. One end of the spring 135 is anchored on the lever 90 and the other end of this spring is anchored on a pin 138 on the cylindrical member 87. On turning the lever 90 against the tension of the spring 135 from the normal, dot-and-dash line position into the full line position shown in Fig. 4, the cam 92 is turned into the angular position shown in Fig. 12, forcing thereby the thread guide 101 and deflector 114 into the relative "stitching" position in which the slot 107 in the thread guide 101 is in the path of reciprocation of a needle 140 and the deflector 114 is immediately in front of the needle path. It is this relative stitching position in which the thread guide 101 and deflector 114 are held at all times except during a winding operation. Hence, the thread guide 101 and deflector 114 are also in their relative stitching position when the machine is at rest and work is inserted. To perform the latter task, the operator raises the presser foot 60 and the winder head B (Fig. 11), as explained, and inserts the material W between the work plate 51 and the raised presser foot, guiding thereby the button $b$ against the deflector 114 until the button is tilted and its thread shank $s$ is in substantial alignment with the notch 77 in the raised presser foot, whereupon the presser foot is lowered into clamping engagement with the material W. The material and button are thus located in the machine (Fig. 12) and the needle 140 may then be reciprocated once to pass needle thread $t$ through the material and leave the first thread loop $l'$ below the work plate 51 where said loop is anchored in a manner described hereinafter. During the first descent of the needle 140 the same passes progressively through the slot 107 in the thread guide 101, the notch 77 in the presser foot 60, the clamped material W, and an opening 141 in a throatplate 142 which is fitted into the work plate 51 and mounted in a manner described hereinafter. The yoke 115 of the deflector 114 is preferably grooved in back as shown at 143 in Figs. 12 and 24 to admit the needle 140 into close proximity to the thread shank $s$ and for another purpose which will become apparent hereinafter. After anchoring the loop $l'$ below the work plate 51, the cam 92 is permitted to return to its normal angular position (corresponding to the dot-and-dash line position of the lever 90 in Fig. 4) under the action of the spring 135, thereby shifting the thread guide 101 and deflector 114 into the relative winding position shown in Fig. 13 in which the slot 107 of the thread guide is spaced from the thread shank $s$ and the deflector is disengaged from the button $b$ and directs the thread $t$ from the needle 140 past said button and to the thread guide. The thread $t$ then passes from the needle 140 through the groove 143 in back of the deflector 114 to the shallow notch 116 in the latter (Fig. 26), thence along the thread guide 101 and through the slot 107 in the latter to the clamped material W, thence through and below the material to the anchored loop $l'$. The button $b$, when disengaged from the deflector 114, is free to assume a disposition such as shown in Fig. 13, for instance, into which the thread shank $s$ will force the button. The winder head B is then ready to be rotated for a winding operation which will be described hereinafter. After the winding operation is concluded, the cam 92 is again turned into the angular position shown in Fig. 12 in order to return the thread guide 101 and deflector 114 into the relative stitching position and thereby tilt the button $b$ out of the needle path and return the slot 107 in the thread guide into the needle path. The needle 140 is thereupon repeatedly reciprocated to leave behind the thread loops $l^2$, $l^3$ and $l^4$ (Fig. 36) in the formation of the attaching and tying stitches in the material W.

Thread-anchoring mechanism C

Referring more particularly to Figs. 1, 1a and 12, the thread-anchoring mechanism includes the previously mentioned needle 140 which is carried by a hollow needle bar 150 that passes through the sleeve 80 and is guided for axial reciprocation and lateral oscillation in bearing sleeves 151 and 152. The lower bearing sleeve 151 (Fig. 12) is received with clearance in the sleeve 80 and is provided with a ball-shaped end 153 which is seated in complementary sockets 154 and 155, formed by the sleeve 80 and a retainer 156, respectively, the latter being secured to the sleeve by screws 157. The bearing sleeve 151 thus forms a fulcrum about which the needle bar 150 may be oscillated. The upper bearing sleeve 152 (Fig. 1a) has a ball-shaped end 158 which is seated in complementary sockets 159 and 160, provided by a cup 161 and a retainer 162 therein. The cup 161 has a lateral shank 163 which is firmly mounted in a lug 164 of a rocker 165, pivoted at 166 to a mounting bracket 167 which is suitably mounted on the frame 40 (Figs. 3 and 4). Thus, the needle bar 150 will be oscillated about the ball-shaped end of the lower bearing sleeve 151 as a fulcrum (Fig. 12) when the rocker 165 is turned on its pivot 166 (Fig. 1a). Clamped to the needle bar 150 near the upper end thereof (Fig. 1a) is a collar 168, having a shank 169 on which is swivelly mounted a member 170 connected by a link 171 with a long lever 172 which is pivoted at 173 in the frame 40 (see also Fig. 3). Hence, the needle bar 150 will be reciprocated in either end position of its lateral oscillation of predetermined amplitude on rocking the lever 172 up and down, and the needle bar may be oscillated by the rocker 165 without interference from the lever 172. The needle or winding thread $t$ passes from a supply on the machine through tension and take-up provisions, described hereinafter, to and through the hollow needle bar 150, thence out of the needle bar through a hole 174 in the latter (Fig. 12) and to the needle.

The thread-anchoring mechanism further comprises a thread-handling device below the work plate 51. This device comprises a looper 180 on a looper carrier 181 (Figs. 1, 7 and 16) which is mounted on the forward end of a looper shaft 182, journalled in suitable bearings in the horn 41 of the machine. Superposed on a mounting plate 183 on the front wall 184 of the horn 41 (Fig. 16) are three elements of which the lowermost element is a loop manipulator 185 and the other elements are thread cutters 186 and 187 (Figs. 6 and 16 to 19). The throat plate 142, which is fitted into the work plate 51 overlies the uppermost element 187 and is secured to the mounting plate 183 in spaced relation therefrom by screws 188 and 189 which pass through spacers 190 and 191, respectively. The loop manipulator 185 is pivoted on the spacer 190 and has an arm 192 (Fig. 17) with a nose 193 and shoulders 194 flanking said nose. The cutters 186 and 187 are pivoted on the spacer 191 and sweep around the other spacer 190 in the manner best shown in Fig. 6 in order to enable them to move to and from cutting position.

As shown in Figs. 1, 5 and 9, the machine frame 40 is provided with a rib or web 200, providing bearings 201 for a vertical cam shaft 202 on which are mounted two cam wheels 203 and 204. The cam wheel 203 is provided with a peripheral cam groove 205 which receives a follower 206 on the needle bar-reciprocating lever 172. The cam groove 205 is designed to cause one reciprocation of the needle bar 150 on rotation of the cam wheel 203 through one-quarter revolution in the direction of the arrow 207 from the home position shown in Fig. 3. The cam wheel 203 has at the top another cam groove 208 (Figs. 1a and 3), receiving a follower 209 on the rocker 165. The cam groove 208 is so designed that the same will maintain the needle bar 150 in the left end position of its oscillatory range, as viewed from the front of the machine (Fig. 7), during the greater part of the first quarter revolution of the cam wheel 203 from the home position shown in Fig. 3. Shortly before the cam wheel 203 has concluded its first quarter revolution, the rocker 165 is shifted by the inclined portion 210 in the cam groove 208 (Fig. 3), whereby the needle bar 150 is swung into the right end position of its oscillatory range as viewed from the front of the machine.

The looper shaft 182 carries at its rear end a rocker 211 (Figs. 1 and 21), having a follower 212 which is received in a peripheral cam groove 213 in the lower cam wheel 204. Provided in the top face of the cam wheel 204 is another cam groove 214 (Fig. 6), receiving a follower 215 on a rocker 216 which is pivoted at 217 to a bracket 218 on the web 200 in the frame 40 (Fig. 1). The rocker 216 extends to the other side of the web 200 through an aperture 219 in the latter, and is connected by a lengthwise adjustable link 220 with the loop manipulator 185 (Fig. 6). Immediately after the cam wheel 204 starts to turn from the home position shown in Fig. 6 in the direction of the arrow 221, i. e., considerably before the needle 140 penetrates the material on its first reciprocation, an inclined portion 222 of the cam groove 214 causes the loop manipulator 185 to be shifted from the home position shown in Fig. 6 into the position shown in Fig. 25 in which its arm 192 is to the left of the needle path as viewed from the front of the machine. Shortly before the cam wheel 204 concludes its first quarter revolution from home position, i. e., when the needle 140 has almost finished its first reciprocation, another inclined portion 223 of the cam groove 214 causes the loop manipulator to be shifted from the position shown in Fig. 25 into the home position shown in Figs. 6 and 26. The top face of the lower cam wheel 204 is further provided with an annular recess 224 (Figs. 6 and 9). Suitably secured to the cam wheel 204, and concentrically located in the annular recess 224, is a ring 225 which forms together with the recess 224 an annular groove 226, receiving a follower 227 on a lever 228, pivoted at 229 to a bracket 230 on the web 200 in the machine frame 40. The free end of the lever 228 is connected by a lengthwise adjustable link 231 with the cutter 187. A tension spring 232 normally urges the lever 228 in a counter-clockwise direction as viewed in Fig. 6, thereby yieldingly maintaining the follower 227 in engagement with the periphery of the ring 225. The follower 227 is, at least within the confines of the groove 226, cut away to provide a shoulder 233 (Fig. 6), and the periphery of the ring 225 is notched at 234 to provide a radial shoulder 235. The shoulder 235 is spaced from the shoulder 233 of the follower 227 slightly over 90° in the home position of the cam wheel 204 as shown in Fig. 6, so that the follower 227 will ride, during the first quarter revolution of the cam wheel 204, on the concentric periphery of the ring 225 and cause the cutter 187 to remain in the inactive or home position shown in Fig. 6. Immediately after the cam wheel 204 starts on the second quarter of its revolution, however, the shoulder 235 in the ring 225 aligns with the shoulder 233 on the follower 227 and the latter snaps into the notch 234, causing thereby the cutter 187 to shift from the home position shown in Fig. 6 into the cutting position shown in Fig. 29. As the notch 234 is very short, the same will, on continued rotation of the cam wheel 204, quickly return the follower 227 into engagement with the concentric periphery of the ring 225, causing thereby the cutter 187 to return from the cutting position shown in Fig. 29 into the home position shown in Fig. 6. The cutter 186 between the cutter 187 and the loop manipulator 185 (Fig. 16) assumes the home position shown in Fig. 6 when the machine is at rest, but is turned, by means described hereinafter, into the retracted position shown in Fig. 25 even before the cam wheels 203 and 204 start to turn from home position at the beginning of an operating cycle of the machine, so as to be out of the way of the needle for its first reciprocation.

The described cam grooves in the cam wheels 203 and 204 are so coordinated that the following operations take place during the first quarter revolution of said cam wheels from their home position. The loop manipulator 185 is shifted from home position (Fig. 6) into the position shown in Fig. 25 while the needle 140, in the left end position of its oscillatory range, starts to descend. The take-up described hereinafter pays out thread to the needle during its descent. The needle on its descent passes through the clamped material W, and on the following ascent leaves behind a thread loop $l'$ (Figs. 25 and 36). During the latter part of the descent and the early part of the subsequent ascent of the needle on its first reciprocation, the looper carrier 181 is rocked clockwise as viewed in Fig. 7 so that the looper 180 enters the loop $l'$ (Fig. 25) as the same is left behind by the needle. The loop $l'$ is thereafter held by the looper 180 while the needle continues its ascent and until the loop manipulator 185 is returned from the position shown in Fig. 25 to that shown in Fig. 26. During such return movement of the loop manipulator 185, the nose 193 and shoulders 194 on the arm 192 of said manipulator seize the loop $l'$, strip the same from the looper 180 and carry it into clamping engagement with the underside of the nearest cutter 186 in the fashion shown in Fig. 26. The cam wheels 203 and 204 have now concluded their first quarter revolution from home position and are stopped for the following winding operation. Hence, the needle thread $t$ remains firmly clamped to the cutter 186 (Fig. 26) throughout the winding operation, and the loop $l'$ is severed at $x$ (Figs. 29 and 36) by the cutter 187 only after the cam wheels 203 and 204 start the second quarter of their revolution at the conclusion of the winding operation.

The bottom surface of the upper cam wheel 203 is provided with a cam groove 240 (Figs. 1, 3 and 10) in which is received a follower 241 on an arm 242 which is pivoted at 243 to spaced lugs 244 in the machine frame 40. The free end of the arm 242 is bifurcated at 245 and slidably receives a rectangular block 246 which is pivoted at 247 to one end of a push rod 248, guided for axial movement in guides 249 and 250 (Figs. 9 and 4), provided by the web 200 in the machine frame 40 and the bracket 167 in the machine head 42, respectively. The push rod 248 is suitably held against rotation in its guides 249 and 250. The forward end of the push rod 248 carries a depending bracket 251 with a lateral finger 252 (Figs. 1 and 7), and the lever 90 of the winder head B (Figs. 4 and 12) carries a pin 253 which is in the path of movement of the finger 252 on the push rod when the winder head assumes the angular home position previously described (Figs. 1, 4 and 12). The cam groove 240 in the cam wheel 203 is designed to retract the push rod 248 into the dot-and-dash line position shown in Fig. 4 and re-advance the same into the full line position also shown in Fig. 4, when the cam wheel 203 nears the end of its first quarter revolution (after the needle 140 has on its first reciprocation sufficiently ascended to clear the deflector 114) and when the same cam wheel begins its second quarter revolution, respectively, from home position. In all other angular positions of the cam wheel, 203, the cam groove 240 maintains the push rod 248 in the advanced position shown in full lines in Fig. 4. Hence, the thread guide 101 and deflector 114 of the winder head assume the relative stitching position shown in Figs. 11 and 12 at all times, except during a winding operation which takes place while the cam wheels 203 and 204 are stopped at the end of their first quarter revolution and the thread guide 101 and deflector 114 of the winder head assume the relative winding position shown in Fig. 13.

*Actuating mechanism D for winder head*

Referring to Figs. 2 and 5, a horizontal winder shaft 260 is suitably journalled in bearings 261 and 262, provided by the cover plate 14 on the machine frame 40 and the bracket 167 in the machine head 42, respectively. The forward end of the winder shaft 260 carries a bevel gear 263 which meshes with an identical bevel gear 264 on the lower end of a vertical stub shaft 265, journalled in a bearing 266 provided by the bracket 167. The upper end of the stub shaft 265 carries a gear 267 which is of the same size as, and meshes with, the axially immovable gear 85 of the winder head B. The winder shaft 260 is driven at a uniform speed during a winding operation in a manner hereinafter described. To prevent the operator of the machine from getting his hands accidentally caught by the spinning winder head, a guard rail 255 (Figs. 1, 2, 7 and 12) surrounds the winder head and is mounted on the presser foot bar 62.

The winder head B is not only rotated during a winding operation, but is also gradually lifted and lowered in order to guide the winding thread $t$ onto the thread shank $s$ so that the thread is wound progressively from one end of said shank to the other end thereof and back to said one end again, and forms the orderly arranged inner and outer windings $c'$ and $c''$ on the shank (Figs. 27, 28 and 36). To this end, a cam wheel 268 is mounted on a horizontal control shaft 269 (Figs. 1, 2 and 4) which is journalled in bearings 270 and 271, provided by the web 200 in the machine frame 40 and the bracket 167 in machine head 42, respectively. Pivoted at 272 on a lug 273 in the machine frame 40 is a rocker 274, having a follower 275 which is received in a peripheral cam groove 276 in the cam wheel 268. The rocker 274 is provided with an arcuate groove 277 in which is slidably received a block 278 (Fig. 4), pivoted on the end of a pin 279 which is firmly mounted in one end of a lengthwise adjustable link 280, the other end of which has a floating pivot connection 281, 282 (Fig. 1) with the previously described arm 129 of the shifter fork 127. The block 278 is adjustably held in the groove 277 of the rocker 274 by a guide piece 283 which is pivoted in a bracket 284 and provided with a guide groove 283a (Fig. 4) that receives the other square end 279a of the pin 279. The bracket 284 is slidable on a machined surface 285 in the machine frame 40 and guided for vertical movement by an integral rib 286 (see also Fig. 1) which is guided in a vertical slot 287 in the machine frame. Projecting from the guide rib 286 of the bracket 284 is a threaded stud 288 which passes through an index scale 289, slidable in a vertical guide groove 290 in the machine frame 40 (Fig. 7). The end of the stud 288 receives a nut 291 with a handle 292 to secure the bracket 284, as well as the index scale 289, in any vertically adjusted position to the machine frame. Thus, the groove 283a in the guide piece 283 (Fig. 4) will, in any vertically adjusted position of the bracket 284, hold the block 278 in a correspondingly adjusted position in the arcuate groove 277 of the rocker 274 without interfering with the back and forth movement of the link 280 and rocker 274 under the control of the cam groove 276 in the wheel 268. The bracket 284 may be vertically adjusted so that the pin 279 will be in coaxial alignment with the pivot mounting 272 of the rocker 274, with the result that the rocker will not impart its oscillation to the link 280 and the winder head B will not be lifted during a winding operation. To provide for ready vertical adjustment of the bracket 284 in accordance with thread shank $s$ of different lengths, the index scale 289 (Fig. 7), which moves with the bracket 284, is graduated from "0" to "12," for instance, whereby the graduation most nearly corresponding to the length of a thread shank to be wound is brought opposite a marker 295 on the machine frame. Thus, if it is inadvisable for a certain type of work to raise the winder head during a winding operation, the graduation "0" on the index scale 289 is brought opposite the marker 295. If, on the other hand, a thread shank to be wound is of the maximum length for which the machine is designed, the graduation 12 on the index scale 289 is brought opposite the marker 295. For winding thread shanks of intermediate lengths, the corresponding graduations on the index scale 289 are brought opposite the marker 295.

The cam wheel 268 is driven through one complete revolution during a winding operation in a manner described hereinafter, and assumes, when not driven, an angular home position in which the winder head B is held substantially in the lowermost position relative to the presser foot 60, as indicated in Fig. 12. The cam groove 276 in the cam wheel 268 is so designed that the same will, during the first half revolution of the latter from home position, cause the winder head to be gradually lifted from its lowermost position to an extent determined by the vertical adjustment of the bracket 284 (Fig. 1), and will, during the remaining half revolution of said cam wheel, cause the winder head to be gradually lowered into its lowermost position. The arcuate groove 277 in the rocker 274 is disposed concentrically of the pivot 282 (Fig. 1) when the presser foot 60 is in work-clamping position and the cam wheel 268 is in its home position, wherefore the bracket 284, and hence the block 278 in the groove 277, may then be adjusted without changing the lowermost position of the winder head in any way. The floating pivotal connection 281, 282 between the link 280 and the arm 129 of the shifter fork 127 is of the pin and slot type shown in Fig. 1, so that the presser foot 60 and the winder head B may be raised (Fig. 11)

by the previously mentioned foot pedal for the insertion of work in the machine without interference from the link 280. Conversely, the link 130 and the previously described arm 131 are floatingly pivotally connected as indicated at 298, 299 (Fig. 1), so that the winder head may be raised and lowered under the control of the cam groove 276 in the cam wheel 268 without raising the presser foot from clamping position. A tension spring 30 (Figs. 1 and 4) acts on the link 130 to ensure the descent of the winder head together with the presser foot when the latter is lowered into clamping engagement with work on the work plate 51.

The control shaft 269, which carries the cam wheel 268, is driven from the winder shaft 260 at reduced speed. To this end, a gear 300 on the winder shaft 260 is in permanent mesh with a larger gear 301 on a countershaft 302 (Figs. 2 and 9) which is suitably journalled in the machine frame 40 and the back cover 14. Splined at 303 to the countershaft 302 is the hub 304 of an axially slidable gear 305. Rotatable on the hub 304 of the gear 305 is a bracket 307 which is held axially immovable on said hub between said gear 305 and a collar 306a. An arm 306 is rotatable on the bracket 307 and held against axial shifting relative to the bracket 307. The bracket 307 carries a rotatable stub shaft 308 on one end of which is mounted a gear 309 that is in constant mesh with the gear 305. Mounted on the other end of the stub shaft 308 is another gear 310 which is in constant mesh with a gear 311 on a stub shaft 312 which is also journalled in the bracket 307. The gear 311 is adapted to mesh with any one of a series of gears 313 which are of different sizes and mounted on the control shaft 269. The gear pairs 300, 301 and 305, 309 and 310, 311 are so selected that they cause the control shaft 269 to turn at a speed which is considerably lower than that of the winder shaft 260 regardless of whichever of the gears 313 is in mesh with the gear 311. The gears 313 on the control shaft 269 are so selected as to size that, on engagement of the gear 311 on the bracket 307 with different ones of said gears 313, the winder shaft 260 is turned through a variable number of complete revolutions during a single revolution of the control shaft 269 through which the latter is turned during a winding operation, as mentioned. Hence, in order to vary the number of thread windings to be placed on the shank of a button, the bracket 307 is axially shifted on the countershaft 302 and the gear 311 brought into mesh with that one of the gears 313 which will produce the required number of thread windings. To prevent axial movement of the bracket 307 on the countershaft 302 while the gear 311 is in mesh with any one of the gears 313, a pin 314 in a depending arm 315 of the bracket 307 (Fig. 9) is received in any one of a number of holes 316 in a plate 317 which is appropriately curved in order to permit engagement of the gear 311 with any one of the gears 313. The curved plate 317 is suitably mounted in the machine frame 40, and the pin 314 is preferably spring-urged into the holes 316 and carries a knob 319 which is readily accessible through the gate 47 in the machine frame 40. Thus, the machine is adapted not only to wind thread on shanks of variable length (by merely adjusting the bracket 284 and index scale 289), but also to vary the number of thread windings to be wound on a shank (by merely bringing the gear 311 into mesh with different ones of the gears 313).

Fig. 26 illustrates the start of the winding operation. In order that the thread windings may extend close to the clamped material W, that surface of the presser foot 60 which faces the thread guide 101 is made concave (Figs. 13 and 22) so as to admit the thread guide 101 into close proximity to the clamped material W without unduly weakening the presser foot 60. Fig. 27 illustrates the end of the first half of the winding operation during which the winder head has been rotated in the direction of the arrow 320 and simultaneously raised in the direction of the arrow 321 in order to form the inner thread windings c'. That part of the thread guide 101 which projects underneath the button b and from which the winding or needle thread t is payed out to the thread shank s, is made relatively thin in order that the thread windings may extend close to the button b. Fig. 28 illustrates the end of the second half of the winding operation during which the winder head has continued its rotation and has been simultaneously lowered in the direction of the arrow 322, in order to form the outer thread windings c''. The winding or needle thread t is kept under considerable tension during the winding operation, by means hereinafter described, in order to obtain thread windings which are as tight, or tighter, than those applied by hand.

*Stitching mechanism E*

The stitching mechanism, besides including the previously described needle 140 and looper carrier 181 (Figs. 1, 7, 16 and 16a) comprises another looper 330 on the carrier 181, and a loop spreader 331 which is pivoted at 332 on said carrier. The loop spreader 331 is normally held closely adjacent the looper 330 and in substantially the same vertical plane therewith (Fig. 16a) by means of a torsion spring 333 which is suitably secured to the carrier 181 and acts on the tail 334 of the loop spreader 331. The bent-over end of a leaf spring 333a on the carrier 181 prevents the loop spreader 331 from being lifted from the carrier 181. Independently turnable on the looper shaft 182 (Figs. 1 and 16) is a collar 335 on which is mounted a cam plate 336, having a bevelled edge 337 (Figs. 7 and 16a) adapted, on cooperation with the tail 334 of the loop spreader 331, to move the latter into the spreading position shown in Fig. 31, for instance. The loop manipulator 185 is further provided with a loop deflector arm 338 (Figs. 6, 17, 29 and 33), having an arcuate slot 339. The collar 335 on the looper shaft 182 is provided with an arm 340 which is connected by a link 341 with an arm 342 (Figs. 7 and 16), mounted on the forward end of a countershaft 343 which is journalled in suitable bearings in the horn 41 of the machine. The rear end of the countershaft 343 carries a rocker 344 (Figs. 1 and 21), having a follower 345 which is received in a peripheral cam groove 346 in the lower cam wheel 204.

The thread t is passed from a supply (not shown) through an eye 350 on top of the machine (Fig. 3a), thence through a constant tension 351 and a controlled tension 352 to a take-up arm 353, and from there through an eye 354 into the hollow needle bar 150. The eye 354 is adjustable on a threaded stud 354a for the purpose of adjusting the tension of the thread t for properly setting the stitches on actuation of the take-up arm 353. The constant tension 351 is of the conventional construction shown in Fig. 3 and is adjustable. It is this constant tension 351 to which the thread t is subjected during a winding operation. The controlled tension 352 is operative at all times, except during a winding operation, and comprises a hollow plug 355 (Fig. 7) which is threaded into the overhanging head 42 of the machine and secured in place by a nut 356. The plug 355 is provided with a cross pin 357 which extends through diametrically opposite slots 358 in a hollow plunger 359 which is slidable in the plug 355. Slidable on the hollow plunger 359 are cooperating tension disks 360 and 361 which are urged against the plug 355 by a compression spring 362, interposed between the disc 361 and a retainer 363 which is threaded on a stud 364 that is relatively slidably received in the hollow plunger 359 and connected with the cross pin 357. An annular shoulder 365 on the plunger 359 is adapted to engage a similar shoulder in the tension disk 361 and lift the latter from its companion disc 360 when the plunger is depressed. The spring retainer 363 may be manipulated to regulate the pressure which is exerted by the spring 362 against the tension disk 361. To depress the plunger 359 and render the tension 352 inoperative during a winding operation, there is provided a rocker 369 (Fig. 3) which is pivoted at 370 to a lug 371 in the machine head 42. The rocker 369 has an arm 372 which is connected by a link 373 with a lever 374, pivoted at 375 in a bracket 376 on the web 200 in the machine frame 40. One end 377 of the lever 374 constitutes a follower which is adapted to cooperate with a cam lug 378, secured by screws 379 to the underside of the upper cam wheel 203. The plunger 359 is depressed and the tension 352 rendered inoperative when the follower end 377 of the lever 374 cooperates with the cam lug 378. At all other times, the follower end 377 of the lever 374 is adjacent the periphery of the cam wheel 203 and the tension 352 is operative. It appears from Fig. 3 that the cam lug 378 will cause the plunger 359 of the tension 352 to be depressed shortly before the cam wheel 203 reaches the end of its first quarter revolution from the illustrated home position, and will cause said plunger to remain depressed until the cam wheel 203 has started on its second quarter revolution from home position. Hence, the tension 352 is inoperative during a winding operation, i. e., while the cam wheel 203 is stopped at the end of its first quarter revolution from home position.

The take-up arm 353 is pivoted at 380 to the machine head 42 (Figs. 1a and 3) and extends through a slot 381 in the latter to the outside of the machine. A link 382 connects the take-up arm 353 with an arm 383 which is pivoted at 384 to the machine frame 40 (Fig. 1a) and carries a follower 385, cooperating with a cam 386 which is mounted on top of the cam wheel 203. The follower 385 is urged into engagement with the cam 386 by means of a tension spring 387 (Fig. 3).

After a completed winding operation, the cam wheels 203 and 204 are rotated through the remaining three-quarter revolution, by means hereinafter described, in order to complete an operating cycle of the machine. The cutter 186 (Fig. 6) will remain in the retracted position shown in Fig. 25 until the cam wheels 203 and 204 have completed their revolution, so as to be out of the path of the needle in the formation of the final stitches. Immediately after the cam wheels 203 and 204 have started on the second quarter of their revolution and while the needle 140, under the control of the cam groove 205 in the upper cam wheel 203, starts to descend on its second reciprocation in the operating cycle of the machine, the cutter 187 will be advanced to sever the anchored thread loop $l'$ (Fig. 29) and then immediately returned into the retracted position shown in Fig. 6 in the previously explained manner, and the thread guide 101 and deflector 114 of the winder head will be returned, under the control of the cam groove 240 in the cam wheel 203, into the relative stitching position shown in Figs. 12 and 30. The needle bar 150, which has during the latter part of the first quarter revolution of the cam wheel 203 been shifted into the right end position of its oscillatory range as viewed from the front of the machine under the control of the cam groove 208 (Fig. 3), as explained, remains in said right end position during the greater part of its second reciprocation. Fig. 30 illustrates the needle 140 after the same has, on its second reciprocation, penetrated the clamped material W and slightly receded from its lowermost position, leaving behind a thread loop $l^2$. The looper carrier 181, under the control of the cam groove 213 in the cam wheel 204, is meantime turned or swung to the left as viewed in Fig. 7, whereby the looper 330 and loop spreader 331 enter the loop $l^2$ as the same is left behind by the ascending needle (Fig. 30). While the looper carrier 181 is thus turned, the cam plate 336 is out of engagement with the tail 334 of the loop spreader 331 until the looper 330 and loop spreader 331 have entered the loop $l^2$. Thereafter, and during continued turning movement of the looper carrier to the left as viewed in Fig. 7 until the looper 330 and loop spreader 331 reach the position shown in Fig. 31, the tail 334 of the loop spreader rides on the bevelled edge 337 of the cam plate 336, resulting in the spreading of the loop $l^2$, as will be readily understood. The needle 140 has in the meantime reached the end of its second reciprocation and started on its third reciprocation. At the start of its third reciprocation, the needle bar 150 is, under the control of an inclined portion 210' of the cam groove 208 (Fig. 3), swung into the left end position of its oscillatory range as viewed from the front of the machine. The needle thereafter penetrates the material W and enters the aligned and spread loop $l^2$ in the fashion shown in Fig. 31. The looper carrier 181 and cam plate 336 are then actuated, under the control of the cam grooves 213 and 346, respectively, in the cam wheel 204, to effect a quick withdrawal of the looper 330 and loop spreader 331 from the loop $l^2$ and a closing of said loop spreader, and a quick readvancement of the looper 330 and loop spreader 331 into the loop $l^3$ as the latter is left behind by the receding needle (Fig. 32). The released loop $l^2$ has in the meantime, i. e., before the loop $l^3$ is cast, been drawn up and around the needle by the take-up arm 353. After the ascending needle has cleared the material W, the movement of the take-up arm 353, in conjunction with the last part of the ascent of the needle bar 150 above the eye 354, causes the loop $l^2$ to be drawn firmly against the material, thereby setting the first stitch. For its last reciprocation, the needle remains in the left end portion of its oscillatory range as appears from Fig. 33, this being in accordance with the well known procedure for the formation of a tying stitch. Before the needle 140 penetrates the material W on its last descent the looper 330 and loop spreader 331 are advanced into the position shown in Fig. 33 and the latter is moved into the illustrated spreading position, while the loop manipulator 185 is, under the control of an inclined portion 223' of the cam groove 214 (Fig. 6), brought into the position shown in Fig. 33 in which the loop deflector arm 338 deflects the loop $l^3$ so that the needle may subsequently enter said loop. To enter the spread and deflected loop $l^3$, the needle passes through the arcuate slot 339 in the loop deflector arm 338. As soon as the descending needle has entered the loop $l^3$, the looper 330 and loop spreader 331 are withdrawn from said loop $l^3$ and the loop spreader is closed and the loop manipulator 185 returned to the position shown in Fig. 34, all before the needle on its last ascent has sufficiently receded from its lowermost position to leave behind a last loop $l^4$. The take-up arm 353 then draws the released loop $l^3$ up and around the needle in the fashion shown in Fig. 34, and the looper 330 and loop spreader 331 advance and enter the loop $l^4$ as the same is left behind by the ascending needle. During continued ascent of the needle, the looper 330 and loop spreader 331 are further advanced into the position shown in Fig. 35, the loop spreader is moved into its spreading position, and the take-up arm 353 is actuated and draws, with the assistance of the needle bar 150 on its ascent above the eye 354, the spread loop $l^4$ tight and the loop $l^3$ firmly against the material W. After the needle has reached its uppermost position, the cutter 186 is advanced from its retracted position into the position shown in full lines in Fig. 6, whereby its V-shaped cutting edge 196 severs that leg of the spread loop $l^4$ which is a continuation of the last formed stitch in the material W (Fig. 35), leaving thereby a sufficiently long thread end in the needle to form the first loop $l^1$ and anchor the same on the first reciprocation of the needle in the next operating cycle of the machine.

*Driving means F for the mechanisms C, D and E*

Referring to Figs. 1 and 5, there is provided a sleeve 390 which rotates on a shaft 391 and is journalled in a ball bearing 392 in the machine frame 40 (Fig. 5). Keyed at 393 to the sleeve 390 is a pulley 394 which is driven from any suitable prime mover through intermediation of a belt 395. Also keyed at 396 to the sleeve 390 is the driving element 397 of a "main" clutch 398, the driven element 399 of which is keyed at 400 to the shaft 391. Keyed to the same shaft 391 at 401 (Fig. 1), and journalled in a bearing 402 on the web 200 in the machine frame 40, is the hub 403 of the driving element 404 of a stitch clutch 405, the driven element 406 of which is keyed at 407 to a shaft 408 which is coaxial with the shaft 391 and journalled in spaced bearings 409, mounted on the web 200 in the machine frame 40. The shaft 408 carries a worm 410 which is in constant mesh with a worm gear 411 on the vertical cam shaft 202 (Fig. 9) that carries the cam wheels 203 and 204. It is, therefore, apparent that the cam wheels 203 and 204 are driven when the main clutch 398 and the stitch clutch 405 are engaged, and said cam wheels are at rest when either one of these clutches is disengaged. The engagement and disengagement of the clutches 398 and 405 is under the control of stop arms 412 and 413, respectively (Figs. 1 and 10). The stop arm 412 is mounted on a stub shaft 414 which is journalled in a bearing lug 416 in the machine frame 40 (Fig. 6), and the stop arm 413 is pivoted at 415 to another bearing lug 417 in the machine frame.

The driving element 397 of the main clutch 398 is provided with peripheral gear teeth 418 which are in constant mesh with teeth 419 on the periphery of the driving element 420 (Fig. 5) of a "winder" clutch 421, the driven element 422 of which is suitably mounted on the winder shaft 260. The driving element 420 of the winder clutch is freely rotatable on the winder shaft 260. The engagement and disengagement of the winder clutch 421 is under the control of a stop arm 423 (Fig. 10) which is pivotally mounted at 424 on the previously mentioned lug 417 and another lug 417a in the machine frame 40 (Fig. 6).

Inasmuch as the clutches 398, 405, 421 and their respective stop arms 412, 413, 423 are of identical construction and essentially like the clutch and stop arm described in the prior Patent No. 2,186,228, dated January 9, 1940, only one of these clutches, in the present instance the main clutch 398 and its stop arm 412, will be described with reference to Fig. 20. The driving element 397 of the main clutch, which is rotated in the direction of the arrow 425, is provided with an inclined shoulder 426. The driven element 399 of the main clutch is provided with a stop surface 427 and a socket 429 for the ball-shaped end 430 of a dog 431 which is normally forced by a spring-urged plunger 432 into driving engagement with the shoulder 426 of the driving element 397. The stop arm 412 for the main clutch comprises a hollow arm 433 in which is slidable a plunger 434, having a stop shoulder 435. The plunger 434 carries a cross pin 436 the opposite ends of which extend through diametrically opposite slots 437 in the hollow arm 433, and said plunger is normally urged outwardly by a spring 438 to the extent permitted by the pin and slot connection 436, 437. When the stop arm 412 is swung about the axis of the stub shaft 414 such that the stop shoulder 435 on the plunger 434 is brought into the path of rotation of the dog 431, said stop shoulder 435 will, on impact with the dog, force the latter out of engagement with the shoulder 426 and into engagement with the stop surface 427 of the driven element 399. When engaged by the dog 431, the plunger 434 will yield somewhat and thus cushion the impact of the dog. Pivotally mounted at 439 on the plunger 434, and normally urged by a spring 440 against a stop pin 441, is a latch 442. When the plunger 434 knocks the dog 431 from driving engagement with the shoulder 426 of the driving element 397, an inclined surface 443 of a projecting lug 444 on the driven element 399 strikes against an inclined surface 445 of the latch 442 and cams the latter out of the path of rotation of said lug 444. As soon as the lug 444 has cleared the inclined surface 445 of the latch 442, the latter snaps into the latching position shown in Fig. 20 and prevents the driven element 399 from backing away from its disengaged position, thereby preventing an unauthorized re-engagement of the main clutch. Hence, the driven element 399 of the main clutch is, upon clutch disengagement, arrested in an invariable rest position. To re-engage the main clutch 398, the stop arm 412 is rocked about the axis of the stub shaft 414 so that the spring-urged plunger 434 and the latch 442 disengage from the dog 431 and lug 444, respectively, whereupon the dog is free to move, under the force of the spring-urged plunger 432, into the path of the shoulder 426 of the driving element 397. However, while the stop arms 413 and 423 for the stitch clutch 405 and the winder clutch 421, respectively, are swung to and from the rotary axes of these clutches (Fig. 10) in order to cause engagement and disengagement of the latter, the stop arm 412 for the main clutch 398 is, for a reason that will become apparent hereinafter, swung in a plane parallel to the rotary axis of said main clutch (Figs. 1 and 6) in order to cause engagement and disengagement of the latter.

*Control G for the driving means F*

To start an operating cycle of the machine, the stop arm 412 for the main clutch 398 is rocked into clutch-engaging position, i. e., counter-clockwise as viewed in Fig. 1, by depressing an arm 450 which is mounted on one end of the stub shaft 414 that projects to the outside of the machine (Fig. 6). The arm 450 is preferably depressed by a foot pedal (not shown) through intermediation of a chain or cable 451 (Fig. 1). While the machine is at rest, the winder clutch 421 is disengaged and the stitch clutch 405 engaged, so that the cam wheels 203 and 204 are immediately rotated from their home position when the main clutch 398 is engaged. The stitch clutch 405 is disengaged and the winder clutch 421 engaged when the cam wheels 203 and 204 have completed their first quarter revolution from home position, and the winder clutch 421 is disengaged and the stitch clutch 405 re-engaged when the winding operation is completed. This is acomplished by the following mechanism. Journalled with its ends in the cover plate 14 and a bearing 18 provided by the web 200 in the machine frame 40 (Fig. 2) is a horizontal shaft 452 which carries a disk 453, having in its opposite faces cam grooves 454 and 455 (Figs. 2, 10 and 14) which receive followers 456 and 457, respectively, on links 458 and 459, respectively, which are pivotally connected with one end at 460 and 461, respectively, with the stop arms 423 and 413, respectively. The other end of the link 459 is bifurcated at 462 and slidably received on a square block 463 which is freely rotatable on the shaft 452, and the other end of the link 458 is likewise bifurcated at 464 (Fig. 8) and slidably received on a square block 465 which is freely rotatable on the shaft 452. The cam grooves 455 and 454 are so designed and coordinated that they cause disengagement of the stitch clutch 405 and engagement of the winder clutch 421, respectively, during the first half revolution of the disk 453 from the home position shown in Fig. 10 into an intermediate position, and cause disengagement of the winder clutch 421 and engagement of the stitch clutch 405, during the second half revolution of the disk 453 from the intermediate position into the home position. More particularly, the disk 453 is indexed through three equal steps of 60 degrees each in order to pass through the first half of its revolution from home position, and is then indexed through three more equal steps of 60 degrees each in order to pass through the second half of its revolution. During the first indexing step of the disk 453 from home position (Fig. 10), the cam groove 455 causes disengagement of the stitch clutch 405. Nothing happens during the following indexing step of the disk 453, but on the third indexing step of the latter into the intermediate position the cam groove 454 causes engagement of the winder clutch 421. During the first indexing step of the disk 453 from the intermediate position, the cam groove 454 causes disengagement of the winder clutch 421. Nothing happens during the following indexing step of the disk, but on the third indexing step of the latter into home position the cam groove 455 causes reengagement of the stitch clutch 405. To index the disk 453, there is provided a Geneva drive consisting of a driven wheel 470 and a driver 471 (Figs. 2 and 14). The Geneva-driven wheel 470 is mounted on the shaft 452 and provided with six equi-angularly spaced, radial slots 472, while the Geneva driver 471 has a driving pin 471a and is rotatable and axially slidable on a stub shaft 473 which is mounted in the cover plate 14 on the machine frame 40 (Fig. 2). The Geneva driver 471 is movable to and from driving relation with the Geneva-driven wheel 470 by means of a shifter fork 474 which is pivotally mounted at 475 on a bracket 476 in the machine frame 40 and carries opposite rollers 477, received in a peripheral groove 478 in the Geneva driver 471. The Geneva driver 471 is provided with peripheral gear teeth 479 which are in constant mesh with a gear 480 (Figs. 2 and 8), freely rotatable on the shaft 452 and integral with another gear 481 which is in constant mesh with a gear 482, freely rotatable on the winder shaft 260 and suitably drivingly connected with the driving element 420 of the winder clutch 421 (Fig. 5). The gears 480, 481 and 482 are of such size and so coordinated that the Geneva driver 471 is driven at the same angular speed as the driving element 420 of the winder clutch 421. The gear 480 is so wide (Fig. 2) that it will remain in constant mesh with the gear teeth 479 on the Geneva driver 471 regardless of whether the latter is in or out of driving relation with the Geneva-driven wheel 470, and the Geneva driver 471 will be driven whenever the driving element 397 of the main clutch 398 is driven, as will be readily understood. The Geneva driver 471 is also provided with a concentric sleeve 20 (Fig. 2) which registers with each of the arcuate notches 21 (Fig. 14) in the periphery of the Geneva-driven wheel 470 between indexing steps of the latter, and said sleeve 20 has a cut-away portion 22 opposite the driving pin 471a, so that the sleeve arrests the Geneva-driven wheel against rotation in each of its six intermittent stop positions, except while driving pin 471a passes through each of the radial slots 472 in the Geneva-driven wheel and indexes the latter. The forward end of the sleeve 20 is fully cylindrical so that the Geneva-driven wheel 470 is completely arrested against rotation while the Geneva driver 471 is out of driving relation with the Geneva-driven wheel (Fig. 2).

To shift the Geneva driver 471 into and out of driving relation with the Geneva-driven wheel 470 at the proper times in an operating cycle of the machine, the following mechanism is provided. The shifter fork 474 has a forked end 485 (Figs. 2, 6 and 14) which receives a pin 486, carried by a clevis 487 the shank 488 of which is slidable in the lateral extension 489 of a tubular rocker 490 (Fig. 6). A compression spring 488a normally urges the clevis 487 to the right as viewed in Fig. 6, thereby yieldingly maintaining the pin 486 in the forked end 485 of the shifter fork 474. One end of the rocker 490 is journalled on the end of a stub 491, mounted in the bracket 476 (see also Fig. 10), and the other end of the rocker 490 receives a portion of a stub 492 which is journalled with its remaining portion in the bracket 476. A cross pin 493 is carried by the rocker 490 and extends with one end 494 into a fork 495, the cylindrical shank 496 of which is rotatably mounted in one arm 497 of a bell crank lever 498, pivoted at 499 on the bracket 476 for rotation about an axis at right angles to that of the rocker 490. The other arm 500 of the bell crank lever 498 is connected by a lengthwise adjustable link 501 (Fig. 14) with a lever 502, the lower forked end of which is pivoted at 503 to the bracket 476 (see also Fig. 2). The lever 502 is normally urged by a spring 504 into the inoperative position shown in Fig. 10a in which the same holds the Geneva driver 471 out of driving relation with the Geneva-driven wheel 470 and in engagement with the boss 505 on the cover plate 14 at the rear of the machine frame 40 (Fig. 2), through intermediation of link 501, bell crank lever 498, fork 495 and pin 493, rocker 490 and clevis 487. On turning the lever 502 from the inoperative position shown in Fig. 10a into the operative position shown in Fig. 10, the Geneva driver 471 is moved into driving relation with the Geneva-driven wheel 470, as will be readily understood. The lever 502 is turned into its operative position for the first time in an operating cycle of the machine by a rocker 506 (Figs. 2, 6 and 14) which is pivoted at 507 to the machine frame 40 and connected by a link 508 with the lever 502. The lever 502 is arrested in its operative position (Figs. 10 and 14) by a latch bar 509 which is pivotally mounted at 510 in the machine frame 40 and engages a pin 511 on said lever 502. The latch bar 509 is provided with a tooth-shaped projection 512 which is normally urged by a spring 513 into engagement with a cam 514 on the shaft 452. When the lever 502 is in its inoperative position (Fig. 10a), the latch bar 509 rests idly on the pin 511. When the lever 502 is rocked from inoperative into operative position, the latch bar 509 will be drawn into the latching position shown in Fig. 10 and the projection 512 on said latch bar will come to rest on the concentric portion of the cam 514. The cam 514 is provided with two diametrically opposite lobes 515 and 516 which are adapted, at the end of the first half revolution and at the end of the second half revolution, respectively, of the cam 514 and disk 453 from home position (Fig. 10), to raise the latch bar 509 beyond the pin 511 and permit the lever 502 to yield into the inoperative position shown in Fig. 10a. Thus, when the lever 502 is rocked into its operative position for the first time in an operating cycle of the machine, the Geneva driver 471 is shifted into driving relation with the Geneva-driven wheel 470 and the disk 453 is driven in three indexing steps through the first half of its revolution, thereby causing disengagement of the stitch clutch 405 and engagement of the winder clutch 421. Toward the end of the first half revolution of the disk 453, the lobe 515 on the cam 514 will raise the latch bar 509 above the pin 511, whereupon the lever 502 will return to its inoperative position and cause the Geneva driver 471 to be shifted out of driving relation with the Geneva-driven wheel 470. When the lever 502 is rocked into its operative position for the second time in an operating cycle of the machine by means other than the rocker 506 (to be described hereinafter), the Geneva driver 471 is again shifted into driving relation with the Geneva-driven wheel 470, whereupon the disk 453 is driven in three more indexing steps through the second half of its revolution during which the winder clutch 421 is disengaged and the stitch clutch 405 reengaged. At the end of the second half revolution of the disk 453, the lobe 516 on the cam 514 will raise the latch bar 509 above the pin 511, whereupon the lever 502 will return to its inoperative position and cause the Geneva driver 471 to be shifted out of driving relation with the Geneva-driven wheel 470.

Mounted on the bottom surface of the lower cam wheel 204 (Fig. 1) is a gear 520 which is in constant mesh with a gear 521, journalled at 522 in the machine frame 40. The gear 521, which is of the same size as the gear 520, carries a cam lug 523 which is adapted, during rotation of the gear 521 in the direction of the arrow 524 in Figs. 6 and 14, to engage a cam lug 525 on the rocker 506 and turn the latter so as to rock the lever 502 into its operative position (Fig. 10) through intermediation of the link 508. Fig. 6 shows the cam lugs 523 and 525 in the relative position which they assume when the machine is at rest. While only a few degrees rotation of the gear 521 will bring the cam lug 523 into engagement with the lug 525 and effect the shifting of the Geneva driver 471 into driving relation with the Geneva-driven wheel 470, the cam lug 523 travels beyond the lug 525 on the rocker 506 and the stitch clutch 405 is not disengaged until the cam wheel 204 has substantially finished its first quarter revolution from home position and performed the various functions previously explained. This is partly due to the fact that even after the Geneva driver 471 has been shifted into driving relation with the Geneva-driven wheel 470, the driving pin 471a of the Geneva driver passes through the greater part of one revolution before entering a slot 472 in the Geneva-driven wheel and actually indexing the latter and, hence, the cam disk 453 which controls the engagement and disengagement of the stitch clutch. Additional lag is caused by the shift of the stop arm for the stitch clutch into stopping position and the time elapsing between the arrival of said stop arm in stopping position and the actual disengagement of the stitch clutch.

Referring to Figs. 1, 10 and 14, the arm 500 of the bell crank lever 498 is connected by a link 530 with a depending arm 531 on a sleeve 532 which is journalled on a horizontal shaft 533, the ends of which are mounted in the bracket 230 on the web 200 of the machine frame and in a boss 535 on the rear wall of the machine frame, respectively. The sleeve 532 has another arm 536 which is connected by a lengthwise adjustable link 537 with one arm 538 of a bell-crank lever 539, pivoted at 540 to a bracket 541 on the web 200 in the machine frame. The other arm 542 of the bell crank lever 539 carries a laterally projecting pin 543 which is cut away at 544. The pin 543 is adapted to cooperate with a finger 545 on a collar 546 which is carried by the control shaft 269. Toward the end of a winding operation in an operating cycle of the machine, i. e., toward the end of one revolution of the control shaft 269 in the direction of the arrow 547 in Fig. 10, as previously mentioned, the finger 545 on the collar 546 engages the pin 543 on the bell-crank lever 539 and rocks the latter from the dot-and-dash line position into the full line position shown in Fig. 10, thereby shifting the lever 502 into its operative position through intermediation of the link 537, sleeve 532 and links 530 and 501. When the lever 502 is thus shifted into its operative position for the second time in an operating cycle of the machine, the Geneva driver 471 is again brought into driving relation with the Geneva-driven wheel 470 and the disk 453 turned in three successive indexing steps through the second half of its revolution during which the winder clutch 421 is disengaged and the stitch clutch 405 reengaged. Also, the lever 502 is arrested in its operative position by the latch bar 509 until the cam 514 and disk 453 have completed their second half revolution, as will be readily understood. When the lever 502 is again unlatched, the same will yield into the inoperative position shown in Fig. 10a and return the bell crank lever 539 into the dot-and-dash line position shown in Fig. 10 in which the pin 543 is in the path of rotation of the finger 545 in the next operating cycle of the machine.

A brief, invariable time period will elapse before the winder clutch 421 is disengaged after the lever 502 is shifted into its operative position for the second time in an operating cycle of the machine in the manner above described. This is due to the fact that even after the Geneva driver 471 has been shifted into driving relation with the Geneva-driven wheel 470, the driving pin 471a of the Geneva driver passes through part of one revolution before entering a slot 472 in the Geneva-driven wheel and actually indexing the latter and, hence, the cam disk 453 which controls the engagement and disengagement of the winder clutch. The control shaft 269 is driven at variable speed, depending upon which one of the gears 313 thereon is in mesh with the gear 311, as will be readily understood. Hence, the finger 545 on the collar 546 (Fig. 8) will, after tripping the bell crank lever 539, travel beyond the pin 543 on the latter an angular distance which varies with each gear 313 that is meshed with the gear 311. Thus, when the gear 311 is in mesh with the largest one of the gears 313, the collar 546 and finger 545 will come to a stop in the full line position shown in Fig. 8 after tripping the bell crank lever 539. When the gear 311 is in mesh with the smallest one of the gears 313, the collar 546 and finger 545 will come to a stop in the dot-and-dash line position shown in Fig. 8 after tripping the bell crank lever 539. When the gear 311 is in mesh with any of the other gears 313, the collar 546 and finger 545 will come to a stop intermediate the full line and dot-and-dash line positions of said collar 546 and finger 545 in Fig. 8. In order that the control shaft 269 and cam wheel 268 will rotate through one complete revolution during each operating cycle of the machine so that the winder head B will, at the end of each winding operation, come to rest substantially in the position shown in Fig. 12 superposed on the presser foot 60 despite occasional shifting of the gear 311 into meshing engagement with different ones of the gears 313, provisions are made to angularly adjust the control shaft 269, on shifting the gear 311 into meshing engagement with any of the gears 313, such that the collar 546 and finger 545 are brought into the corresponding angular stop position. To this end, there is provided a cam plate 1 (Figs. 10b–d) having a collar 2 which is journalled on a reduced portion 3 of the cam wheel 268. The plate 1 is provided with a cam groove 4 which cooperates with a follower 5 on the earlier mentioned arm 306. The arm 306 is axially movable with the gear bracket 307 and its forked end 6 straddles the winder shaft 260 (Fig. 10c) so that said arm 306 is non-rotatable. Received by the plate 1 is a spring-urged plunger 7 which is adapted to register with a depression 8 in the largest one of the gears 313. On axially shifting the bracket 307 on the countershaft 302, while the machine is at rest, in order to bring the gear 311 opposite the largest one of the gears 313 for instance, the cam groove 4 and follower 5 cooperate to turn the plate 1 about the axis of the control shaft 269 such that the collar 546 and finger 545 are shifted, through intermediation of the plunger 7 (Fig. 10b) and the gears 313 on the shaft 269, into the full line position shown in Fig. 8 which is the correct stop position for the largest one of the gears 313, as explained. On axially shifting the bracket 307 so as to bring the gear 311 opposite the smallest one of the gears 313, the cam groove 4 and follower 5 cooperate to cause the shifting of the collar 546 and finger 545 into the dot-and-dash line position shown in Fig. 8 which is the correct stop position for the smallest gear 313, as explained. On axially shifting the bracket 307 so as to bring the gear 311 opposite any of the other gears 313, the cam groove 4 and follower 5 cooperate to cause the shifting of the collar 546 and finger 545 into the stop position corresponding to the selected gear 313, as will be readily understood. Of course, the spring-urged plunger 7 will be cammed out of the depression 8 at the start of the single revolution of the gears 313 in each operating cycle of the machine, and said plunger 7 will reenter said depression 8 when the latter realigns with the former at the end of the revolution. The different starting and stopping positions of the collar 546 and finger 545 entail correspondingly different home positions of the cam wheel 268, wherefore the winder head B will come to rest in correspondingly different positions of its up and down movement, as will be readily understood. However, the angular range within which the home positions of the cam wheel 268 vary is so small, and the slope of the peripheral cam groove 276 in the cam wheel 268 is so gradual, that the winder head B stops at the end of its up and down movement for all practical intents and purposes in the lowermost position relative to the presser foot 60 (Fig. 12), regardless of whichever one of the gears 313 is in mesh with the gear 311.

*Stop mechanism H for machine*

Referring to Figs. 1, 6 and 15, the stop mechanism comprises another cam lug 550 on the gear 521 which is adapted to cooperate with a link member 551, pivotally connected at 552 with an arm 553 and at 554 with one end of a link 555. The other end of the link 555 is pivotally connected at 556 with a clevis 557 the threaded shank 558 of which is received in a wall of the machine frame 40, and the arm 553 is mounted on a stub shaft 559 which is journalled in a boss 560 in the machine frame. The arm 553 is connected at 561 with one end of a lengthwise adjustable link 562, the other end of which is connected at 563 with a spring-urged plunger 564 in the stop arm 412 for the main clutch 398. When the main clutch 398 is engaged, the stop arm 412 assumes the dot-and-dash line position shown in Fig. 1. The machine is to be stopped at the end of one complete revolution of the cam wheels 203 and 204, as previously mentioned. Shortly before the cam wheels 203 and 204, and, hence, the gear 521, reach the end of one revolution, the cam lug 550 engages the link member 551 and shifts the same from the dot-and-dash line position into the full line position shown in Fig. 6, thereby rocking the arm 553 into the position shown in Fig. 15 and turning the stop arm 412 into the clutch disengaging position shown in said Fig. 15 as well as in full lines in Fig. 1. The main clutch 398 will thus be disengaged and the machine come to rest shortly after the cam lug 550 on the gear 521 clears the link member 551 (Fig. 6). In order securely to hold the stop arm 412 in clutch engaging position as well as in clutch-disengaging position, the outer end of the spring-urged plunger 564 is V-shaped and adapted to cooperate with a detent 570 in the bottom of the machine frame 40.

Mounted on the vertical stub shaft 559 (Figs. 6 and 15) is a lever 571 which is connected by a lengthwise adjustable link 572 with the previously described thread cutter 186 that severs the last loop $l^4$ (Fig. 35) in the formation of the attaching and tying stitches. Hence, the thread cutter 186 is rocked into the retracted position shown in Fig. 25 when the main clutch 398 is engaged, and said thread cutter 186 is rocked into the operative position shown in full lines in Fig. 6 when the main clutch is disengaged.

As best shown in Figs. 1 and 15, the lever 571 is connected by a link 575 with a stop 576 which is pivotally mounted at 577 on the web 200 in the machine frame 40. When the stop arm 412 for the main clutch 398 is in the clutch engaging position shown in dot-and-dash lines in Fig. 1, the stop 576 assumes the dot-and-dash line position shown in said Fig. 1 in which the same is out of the path of rotation of a lug 578 on a collar 579 which is mounted on the shaft 408 that drives the cam wheels 203 and 204 through intermediation of the worm 410 and worm gear 411. When the stop arm 412 is, however, turned into the clutch disengaging position shown in Fig. 15 and also in full lines in Fig. 1, the stop 576 is rocked into the path of rotation of the lug 578 and the latter will move into engagement with the former shortly after the main clutch 398 is disengaged and while the engaged stitch clutch 405, shaft 408 and the cam wheels 203 and 204 continue to rotate under their own momentum. The collar 579 is so angularly disposed on the shaft 408 that the lug 578 engages the stop 576 substantially when the cam groove 205 in the upper cam wheel 203 (Fig. 1) returns the needle bar 150 to its uppermost position at the end of its last reciprocation in the formation of the attaching and tying stitches.

In order to operate the machine by hand for purposes of adjustment and inspection, the pulley 394 on the sleeve 390 is provided with a knurled hand wheel 580 (Figs. 2, 4 and 5). To prevent reverse operation of the machine, a lock arm 581 (Figs. 1 and 8) is journalled on the previously mentioned shaft 533 and normally urged by a spring 582 into engagement with the periphery of the driving element 397 of the main clutch 398. It appears clearly from Fig. 8 that the lock member 581 will permit rotation of the driving clutch element 397 in the direction of the arrow 584 but not in the opposite direction.

*Mode of operation of machine*

After inserting the work in the machine as explained, the operator trips the starting lever 450 (Figs. 1 and 15), thereby causing engagement of the main clutch 398 and retraction of the thread cutter 186 into the inoperative position shown in Fig. 29, as well as withdrawal of the stop 576 from the lug 578 (Fig. 1) to release the thread-anchoring and stitching mechanism C and E for operation. While the machine is at rest, the stitch clutch 405 is engaged and the winder clutch 421 is disengaged so that the cam wheels 203 and 204 start to turn immediately on engagement of the main clutch 398 and cause an operation of the thread anchoring mechanism C, i. e., formation of the first needle thread loop $l'$ (Fig. 25) and its anchorage below the clamped material (Fig. 26), as described. The thread anchoring mechanism C performs its operation during the first quarter revolution of the cam wheels 203 and 204 from home position. Shortly before the cam wheels 203 and 204 reach the end of their first quarter revolution, the thread guide 101 and deflector 114 of the winder head B are shifted from their relative stitching position (Fig. 25) into their relative winding position (Fig. 26) for a subsequent winding operation, and the control G (Fig. 6) causes disengagement of the stitch clutch 405 just when the cam wheels 203 and 204 reach the end of their first quarter revolution, and subsequent engagement of the winder clutch 421, all as previously described. The winder head B thereupon performs its winding operation (applies the inner and outer thread windings $c'$ and $c''$ to the thread shank $s$ of the button as previously described and shown in Figs. 27 and 28), during which operation the control shaft 269 rotates (Figs. 4, 10 and 14). Shortly before the control shaft 269 has completed one revolution, the finger 545 on the same renders the control G operative for the second time in the operating cycle of the machine, thereby causing disengagement of the winder clutch 421 and re-engagement of the stitch clutch 405. Immediately after the cam wheels 203 and 204 resume their rotation on re-engagement of the stitch clutch 405, the anchored thread loop $l'$ is severed by the cutter 187 (Fig. 29) and the thread guide 101 and deflector 114 of the winder head B are returned into the relative stitching position shown in Fig. 30, all as previously described. The stitching mechanism E performs its described operation (formation of the attaching and tying stitches in the material) while the cam wheels 203 and 204 pass through the remaining three quarter revolution. Shortly before the cam wheels 203 and 204 reach the end of their single revolution in the operating cycle of the machine, the cam lug 550 on the gear 521 (Figs. 6 and 15) actuates the described stop mechanism H, thereby not only causing disengagement of the main clutch 398, but also severance of the last loop $l^4$ in the stitch formation by the cutter 186 (Fig. 35), as well as stoppage by the part 576 (Fig. 1) of the moving parts of the stitching mechanism E in a predetermined relative position in which the needle bar 150 is substantially in its uppermost position and the needle 140 is ready for its first reciprocation in the next operating cycle of the machine.

What is claimed is:

1. In a button winding machine, means for supporting a fabric to which a button is secured by stitches forming a thread shank, a thread guide projecting underneath the button and forming the sole support for the latter, and means for rotating said guide around said thread shank to form a plurality of continuous thread windings thereabout.

2. In a button winding machine, a support for material to which a button is secured by stitches forming a thread shank, a clamp closable against the material on said support, a thread guide operable to rotate about said thread shank to wind a thread about said shank, and also move in the direction of its rotary axis to distribute the thread windings over said shank, and means to operate said guide while said clamp is closed.

3. In a button winding machine, a support for material to which a button is secured by stitches forming a thread shank, a clamp closable against the material on said support, a thread guide projecting underneath the button and forming the sole support for the latter, said guide being operable to rotate about said thread shank to wind a thread about said shank, and also move in the direction of its rotary axis to distribute the thread windings over said shank, and means to operate said guide while said clamp is closed.

4. In a button winding machine, the combination of holding means for material to which a button is secured by stitches forming a thread shank, a longitudinally reciprocable needle, a thread guide projecting underneath the button and being rotatable about said thread shank, and a deflector movably carried by said guide and adapted in one position to tilt the button out of the needle path, and in another position to lead the thread from the needle past the button and to said guide.

5. The combination in a button winding machine as set forth in claim 4, in which said needle extends substantially parallel to the rotary axis of said thread guide, and the latter is provided with a slot and movable transversely of its rotary axis to bring said slot into and out of alignment with said needle.

6. The combination in a button winding machine as set forth in claim 4, in which said needle extends substantially parallel to the rotary axis of said thread guide, and the latter is movable in the direction of its rotary axis and provided with a slot and is also movable transversely of its rotary axis to bring said slot into and out of alignment with said needle.

7. In a button winding machine, the combination of a support for material to which a button is secured by stitches forming a thread shank, a guide rotatable about said thread shank to direct winding thread between the material and button and to said thread shank, and a liftable presser foot projecting underneath the button for clamping the material to the support.

8. The combination in a button winding machine as set forth in claim 7, in which said presser foot is provided with a notch in which to locate said thread shank.

9. In a button winding machine, a support for material to which a button is secured by stitches forming a thread shank, a winding-thread guide rotatable about said thread shank and extending underneath the button transversely of its rotary axis, and a liftable presser foot underneath the button and guide for clamping the material to the support.

10. In a button winding machine, the combination of a support for material to which a button is secured by stitches forming a thread shank, a winding thread guide rotatable about said thread shank and extending underneath the button transversely of its rotary axis, and a liftable presser foot underneath the button and guide for clamping the material to the support, the presser foot surface facing said guide being concave.

11. The combination in a button winding machine as set forth in claim 10, in which said guide is also liftable in the same direction as said presser foot.

12. In a button winding machine, a support for material to which a button is secured by stitches forming a thread shank, a liftable guide rotatable about said thread shank to direct winding thread between the material and button and to said thread shank, a liftable presser foot for clamping the material to the support, means for lifting and lowering said guide and presser foot simultaneously, and means for independently lifting and lowering said guide.

13. In a button winding machine, a support for material to which a button is secured by stitches forming a thread shank, a liftable winding-thread guide above said support rotatable about said thread shank and yieldingly urged toward said support, a liftable presser foot yieldingly urged toward said support to clamp the material thereagainst, two independently operable actuators, and a linkage connecting said actuators with said guide and presser foot, said linkage including pin and slot connections so arranged that operation of one actuator results in simultaneous lifting and lowering of said guide and presser foot and operation of the other actuator results in lifting and lowering of said guide only.

14. In a button winding machine, the combination of a horn having a top terminating at the front in a downwardly extending surface and serving as a support for material to which a button is secured by stitches forming a thread shank, a reciprocable needle adapted to penetrate the material near said thread shank, and means for clamping the material to said top in such position that the button may be tilted from its normal disposition substantially parallel to said top against said downwardly extending front surface so as to be out of the needle path.

15. The combination in a button winding machine as set forth in claim 14, further comprising means for winding thread from the needle about said thread shank when the button is in its normal disposition.

16. The combination in a button winding machine as set forth in claim 14, further comprising means for tilting the button against said downwardly extending surface, and means for winding thread from the needle about said thread shank when the button is in its normal disposition.

17. In a button winding machine, a horn having a top terminating at the front in a downwardly extending surface and serving as a support for material to which a button is secured by stitches forming a thread shank, a reciprocable needle adapted to penetrate the material near said thread shank, a liftable presser foot projecting underneath the button for clamping the material to said top such that the button may be tilted from its normal disposition substantially parallel to said top against said downwardly extending surface to be out of the needle path, and a device operable to tilt the button, and further operable to lead thread from the needle past the button and wind it about said thread shank when the button is in its normal disposition.

18. The combination in a button winding machine as set forth in claim 17, in which said device comprises a thread guide projecting underneath the button and being rotatable about said thread shank, and a deflector movably carried by said guide and adapted on movement into one position to engage the rear face of the button and tilt the same, and on movement into another position to lead thread from the needle past the button and to said guide.

19. In a button winding machine, a support for material to which a button is secured by stitches forming a thread shank, mechanism for passing the leading end of a thread through the material and holding it below said support against withdrawal from the material, and a device for winding said thread about said thread shank while said leading thread end is held below said support.

20. In a button winding machine, a support for material to which a button is secured by stitches forming a thread shank, mechanism for passing the leading end of a thread through the material beneath the button and holding it below said support against withdrawal from the material, a device for winding said thread about said thread shank while said leading thread end is held below said support, and means below said support for severing said thread end from the thread.

21. In a button winding machine, a support for material to which a button is secured by stitches forming a thread shank, a reciprocable needle for passing needle thread through the material and below said support, a device below said support for seizing a thread loop cast by the needle and holding it against withdrawal from the material, and means for winding the needle thread about said thread shank while said thread loop is held by said device.

22. The combination in a button winding machine as set forth in claim 21, in which said device comprises a movable looper for seizing said thread loop, a surface, and a movable member for removing said loop from said looper and clamping it against said surface.

23. In a button winding machine, the combination of a support for material to which a button is secured by stitches forming a thread shank, a reciprocable needle for passing needle thread through the material and below said support, a thread-holding device below said support comprising a movable looper for seizing a thread loop cast by the needle, a surface, and a member movable transversely of the needle axis for removing said loop from said looper and clamping it against said surface, said member having spaced shoulders engaging the legs of the loop and a nose entering said loop, and means for winding the needle thread about said thread shank.

24. The combination in a button winding machine as set forth in claim 23, further comprising a knife between said member and support movable to sever the clamped thread loop from the remaining thread.

25. In a button winding machine, the combination of a support for material to which a button is secured by stitches forming a thread shank, a first mechanism for passing the leading end of a thread through the material and holding it below said support against withdrawal from the material, a device for winding said thread about said thread shank while said thread end is held below said support, and other mechanism for forming stitches of said thread in the material.

26. The combination in a button winding machine as set forth in claim 25, in which said mechanisms include a common reciprocable needle, and said device winds thread from the needle about said thread shank.

27. The combination in a button winding machine as set forth in claim 25, further comprising rotary cam means stationary during the operation of said device and adapted during rotation through a first part of a cycle to operate said first mechanism and during rotation through the remaining part of a cycle to operate said other mechanism.

28. The combination in a button winding machine as set forth in claim 25, further comprising a cutter for severing said leading thread end from the remaining thread, and rotary cam means stationary during the operation of said device and adapted during rotation through a first part of a cycle to operate said first mechanism and during rotation through the remaining part of a cycle to operate said cutter and said other mechanism.

29. In a button winding machine, a support for material to which a button is secured by stitches forming a thread shank, mechanism for passing the leading end of a thread through the material and holding it below said support, a device for winding said thread about said thread shank, other mechanism for forming in the material stitches of said thread terminating in a tying stitch, a knife below said support to sever the thread close to said tying stitch, and a cutter between said knife and support to sever said leading thread end from the thread.

30. In a button winding machine, a support for material to which a button is secured by stitches forming a thread shank; a first mechanism for passing the leading end of a thread through the material and holding it below said support comprising a reciprocable needle above said support, a pivoted carrier below said support, a first looper on said carrier to seize a thread loop cast by the needle on turning the carrier in one direction, a surface below said support, and a movable member for removing said loop from said looper and clamping it against said surface; a device for winding thread from the needle about said thread shank; and other mechanism for forming stitches of needle thread in the material, said other mechanism including another looper on said carrier to seize a thread loop cast by said needle on turning the carrier in the opposite direction, a loop spreader pivoted on said carrier and associated with said other looper, and a cam operable to actuate said spreader.

31. In a button winding machine, the combination of a support for material to which a button is secured by stitches forming a thread shank; a first mechanism for passing the leading end of a thread through the material and holding it below said support comprising a reciprocable needle above said support movable laterally between two dispositions, a pivoted carrier below said support, a first looper on said carrier to seize a thread loop cast by the needle on turning the carrier in one direction, a clamping surface below said support, and a movable member for removing said loop from said looper and clamping it against said surface; a device for winding thread from the needle about said thread shank; and other mechanism for forming stitches, including a tying stitch, in the material, said other mechanism including another looper on said carrier to seize a thread loop cast by said needle in either lateral disposition on turning the carrier in the opposite direction, a loop spreader pivoted on said carrier and associated with said other looper, a cam operable to actuate said spreader, and a movable element for deflecting a thread loop on said other looper into alignment with the needle for penetration by the latter on repeated descent in the same lateral disposition for forming a tying stitch.

32. The combination in a button winding machine as set forth in claim 31, further comprising a knife below said support movable from an inoperative position to sever the thread close to said tying stitch, said knife also providing said clamping surface in its inoperative position.

33. The combination in a button winding machine as set forth in claim 31, in which spaced radial arms of a single rotatable part form said member and element, respectively.

34. In a button winding machine, a support for material to which a button is secured by stitches forming a thread shank, a winding-thread guide rotatable about said thread shank and movable in the direction of its rotary axis, mechanism for rotating said guide through a certain number of revolutions, and an adjustable device operated in timed relation with said mechanism to move said guide through a variable distance.

35. In a button winding machine, a support for material to which a button is secured by stitches forming a thread shank, a winding-thread guide rotatable about said thread shank and movable in the direction of its rotary axis, mechanism for rotating said guide through a certain number of revolutions, and an adjustable device operated in invariable timed relation with said mechanism to move said guide through a distance variable between zero and a certain maximum distance.

36. In a button winding machine, a support for material to which a button is secured by stitches forming a thread shank, a winding-thread guide rotatable about said thread shank and movable in the direction of its rotary axis, mechanism for rotating said guide through a certain number of revolutions, and a device operated in timed relation with said mechanism to move said guide through a certain distance first in one direction and then in the opposite direction.

37. In a button winding machine, a support for material to which a button is secured by stitches forming a thread shank, a winding-thread guide rotatable about said thread shank and movable in the direction of its rotary axis, mechanism for rotating said guide at uniform speed through a certain number of revolutions, and a device operated in timed relation with said mechanism to move said guide at uniform speed through a certain distance first in one direction and then in the opposite direction.

38. In a button winding machine, a support for material to which a button is secured by stitches forming a thread shank, a winding-thread guide rotatable about said thread shank and movable in the direction of its rotary axis, mechanism for rotating said guide through a certain number of revolutions, and an adjustable device operated in timed relation with said mechanism to move said guide through a variable distance first in one direction and then in the opposite direction.

39. In a button winding machine, a support for material to which a button is secured by stitches forming a thread shank, a winding-thread guide rotatable about said thread shank, means including a clutch having a driving and a driven member to drive said guide, mechanism to disengage said clutch, a rotatable controller adapted in a certain angular position to render said mechanism operative, and a driving connection between said driven clutch member and controller including change speed gears.

40. In a button winding machine, the combination of a support for material to which a button is secured by stitches forming a thread shank, a winding-thread guide rotatable about said thread shank and movable in the direction of its rotary axis, adjustable mechanism for rotating said guide through a variable number of revolutions, and a device operated in timed relation with said mechanism to move said guide through the same distance regardless of the number of revolutions of said guide.

41. The combination in a button winding machine as set forth in claim 40, in which said device is adjustable to vary the distance through which said guide is moved.

42. In a button winding machine, a support for material to which a button is secured by stitches forming a thread shank, a winding-thread guide rotatable about said thread shank and movable in the direction of its rotary axis, adjustable mechanism for rotating said guide for a variable length of time, and a device operated in timed relation with said mechanism to move said guide through the same distance regardless of the duration of the rotation of said guide.

43. In a button winding machine, a support for material to which a button is secured by stitches forming a thread shank, a winding-thread guide rotatable about said thread shank and movable in the direction of its rotary axis, means including a clutch having a driving and a driven member to drive said guide, mechanism to disengage said clutch, a rotatable controller adapted in a certain angular position to render said mechanism operative, a driving connection between said driven clutch member and controller including change speed gears, and means including a cam rotatable with said controller to move said guide.

44. In a button winding machine, the combination of a support for material to which a button is secured by stitches forming a thread shank, a winding-thread guide rotatable about said thread shank and movable in the direction of its rotary axis, means including a clutch having a driving and a driven member to drive said guide, mechanism to disengage said clutch, a rotatable controller adapted in a certain angular position to render said mechanism operative, a driving connection between said driven clutch member and controller including change speed gears, and means to move said guide through a variable distance including a cam rotatable with said controller, a pivoted arm having a follower cooperating with said cam, and a motion-transmitting link having a pivot connection with said arm adjustable longitudinally of the latter.

45. The combination in a button winding machine as set forth in claim 44, in which said pivot connection between the link and arm is adjustable into alignment with the pivot axis of said arm.

46. In a button winding machine, a support for material to which a button is secured by stitches forming a thread shank, a winding-thread guide rotatable about said thread shank and movable in the direction of its rotary axis, adjustable mechanism for rotating said guide through a variable number of revolutions, and a device operated in timed relation with said mechanism to move said guide through the same distance first in one direction and then in the opposite direction regardless of the number of revolutions of said guide.

47. In a button winding machine, a support for material to which a button is secured by stitches forming a thread shank, a winding-thread guide rotatable about said thread shank and reciprocable in the direction of its rotary axis, adjustable mechanism for rotating said guide through a variable number of revolutions, and an adjustable device operated in timed relation with said mechanism to reciprocate said guide through a variable distance.

48. In a button winding machine, the combination of a rotatable winder, means including a clutch for driving said winder at uniform speed, mechanism including an operable element for disengaging said clutch an invariable time period after operation of said element, a rotatable member for operating said element on passing the same, a driving connection between said member and winder including change speed gears, and means operative on changing the speed of said gears to angularly adjust said member so that the same is, on clutch engagement, rotated through one complete revolution at any selected speed.

49. The combination in a button winding machine as set forth in claim 48, in which said winder is axially reciprocable, and which further comprises mechanism including a cam rotatable with said member for imparting to said winder an axial reciprocation during one complete revolution of said cam.

50. In a button winding machine, a support for material to which a button is secured by stitches forming a thread shank, a first mechanism for passing the leading end of a thread through the material and anchoring it below said support, a device for winding said thread about said thread shank, other mechanism for forming stitches of said thread in the material, rotary cam means adapted during rotation through a first part of a cycle to operate said first mechanism and during rotation through the remaining part of a cycle to operate said other mechanism, a driver, a first and second clutch for connecting said cam means and device, respectively, with said driver, and clutch control means operable to disengage said first clutch and engage said second clutch, and further operable to disengage said second clutch and engage said first clutch.

51. The combination in a button winding machine as set forth in claim 50, in which said clutch control means include other rotary cam means adapted during rotation through a first part of a cycle to disengage said first clutch and engage said second clutch, and during rotation through the remaining part of its cycle to disengage said second clutch and engage said first clutch, a driven gear of Geneva type rotatable with said other cam means, and a driving gear of Geneva type connected with said driver and axially slidable into and out of mesh with said driven gear.

52. In a button winding machine, a support for material to which a button is secured by stitches forming a thread shank, a first mechanism for passing the leading end of a thread through the material and anchoring it below said support, a device for winding said thread about said thread shank, other mechanism for forming stitches of said thread in the material, rotary cam means adapted during rotation through a first part of a cycle to operate said first mechanism and during rotation through the remaining part of a cycle to operate said other mechanism, a driver, a first and second clutch for connecting said cam means and device, respectively, with said driver, and means including said driver and rendered operative in timed relation with said cam means to disengage said first clutch at the end of said first cycle part and engage said second clutch, and rendered operative in timed relation with said device to disengage said second clutch and reengage said first clutch.

53. In a button winding machine, the combination of a support for material to which a button is secured by stitches forming a thread shank, a first mechanism for passing the leading end of a thread through the material and anchoring it below said support, a device for winding said thread about said thread shank, other mechanism for forming stitches of said thread in the material, rotary cam means adapted during rotation through a first part of a cycle to operate said first mechanism and during rotation through the remaining part of a cycle to operate said other mechanism, driving means including a main clutch having a driving and a driven element, a first and second clutch for drivingly connecting said cam means and device, respectively, with the driven and driving element, respectively, of said main clutch, means including said driving element and rendered operative in timed relation with said cam means to disengage said first clutch at the end of said first cycle part and engage said second clutch, and rendered operative in timed relation with said device to disengage said second clutch and reengage said first clutch, and other means operated in timed relation with said cam means to disengage said main clutch at the end of said remaining cycle part.

54. The combination in a button winding machine as set forth in claim 53, in which said first clutch has a driven and a driving member, and the machine further comprises a lug rotatable with said driven member, a stop element movable into and out of the path of said lug, and means operated by said other means to move said stop element into the path of said lug.

55. The combination in a button winding machine as set forth in claim 53, in which said first clutch has a driven and a driving member, and the machine further comprises a knife for severing the thread adjacent the stitches in the material, a lug rotatable with said driven member, a stop element movable into and out of the path of said lug, and means operated by said other means simultaneously to actuate said knife and move said stop element into the path of said lug.

56. In a button winding machine, the combination of a support for material to which a button is secured by stitches forming a thread shank, a first mechanism for passing the leading end of a thread through the material and anchoring it below said support, a first device for winding said thread about said thread shank, another mechanism for forming stitches of said thread in the material, first rotary cam means adapted during rotation through a first part of a cycle to operate said first mechanism and during rotation through the remaining part of a cycle to operate said other mechanism, driving means including a main clutch having a driving and a driven element, a first and second clutch for drivingly connecting said cam means and device, respectively, with the driven and driving element, respectively, of said main clutch, other rotatable cam means adapted during rotation through a first part of a cycle to disengage said first clutch and engage said second clutch, and during rotation through the remaining part of its cycle to disengage said second clutch and reengage said first clutch, a driven gear of Geneva type rotatable with said other cam means, a driving gear of Geneva type connected with the driving element of the main clutch and axially slidable into and out of mesh with said driven gear, another device rendered operative on rotation of said first cam means through said first cycle part and on completed operation of said first device, respectively, to shift said driving gear into mesh with said driven gear and maintain said gears in mesh to the end of said first and said remaining part, respectively, of a cycle of said other cam means, and means operated on rotation of said first cam means through a complete cycle to disengage said main clutch.

57. The combination in a button winding machine as set forth in claim 56, in which said other device comprises a finger rotated in timed relation with said first device, another finger rotatable with said first cam means, a linkage connected with said driving gear and normally urged into inoperative position in which said driving gear is out of mesh with said driven gear and including two members engageable by said fingers, respectively, to move said linkage into operative position and shift said driving gear into mesh with said driven gear, means normally latching said linkage in operative position, and elements on said other cam means each adapted to unlatch said linkage.

58. In a button winding machine, a support for material to which a button is secured by stitches forming a thread shank, a ring-shaped member above said support rotatable about the button axis, a guide depending from said member to direct thread to said thread shank, a reciprocable needle bar extending through said member and carrying a needle, a deflector movably carried by said guide, a cam rotatably carried by said guide and adapted on rotation into one position to move said deflector so that the same tilts the button out of the needle path, and on rotation into another position to move said deflector so that the same leads thread from the needle past the button and to said guide, and a stop on said member against which said cam is yieldingly urged into said other position.

59. In a button winding machine, a support for material to which a button is secured by stitches forming a thread shank, a ring-shaped member above said support being rotatable about the button axis and having a depending post eccentrically thereof, a reciprocable needle bar extending through said member and carrying a needle substantially coaxially of the button, a cam journalled in said post, a slotted thread guide carried by said post for movement to and from said thread shank and cooperating with said cam, a deflector movably carried by said post and cooperating wtih said cam, said cam being adapted on rotation into one position to cause said deflector to tilt the button out of the needle path and move said guide toward said thread shank until its slot aligns with the needle, and on rotation into another position to cause said deflector to lead thread from the needle past the button and to said guide and move the latter away from said thread shank, and a stop against which said cam is yieldingly urged into said other position.

60. The combination in a button winding machine as set forth in claim 59, in which said member is axially slidable, and the machine further comprises driving means for said member including a gear rotatable coaxially of said member and a pin mounted in said gear parallel to the axis of the latter and slidably received in said member.

61. The combination in a button winding machine as set forth in claim 59, further comprising a clutch having a driving and a driven element, a driving connection of a one-to-one ratio between said member and driven clutch element, means for disengaging the clutch in a certain angular position only of said driven element and arresting the latter in that position, an arm on said cam, and a movable actuator for engaging and turning said arm in the stop position of said member so as to turn said cam into said one position.

62. In a button winding machine, a support for material to which a button is secured by stitches forming a thread shank, mechanism for passing the leading end of a thread through the material and holding it below said support against withdrawal from the material, means for winding said thread about said thread shank while said leading thread end is held below said support to form thread windings about said shank, means for causing said windings to be so distributed lengthwise of said thread shank as to form superposed layers of windings, and means below said support for severing said thread end from the thread.

63. In a button winding machine, a support for material to which a button is secured by stitches forming a thread shank, mechanism for passing the leading end of a thread through the material and holding it below said support against withdrawal from the material, means for winding said thread about said thread shank while said leading thread end is held below said support to form thread windings about said shank, means for causing said windings to be distributed lengthwise of said thread shank once in one direction and once in the opposite direction so as to form two superposed layers of windings, and means below said support for severing said thread end from the thread.

64. Button-winding method, comprising the steps of passing a threaded needle through material to which a button is secured by stitches forming a thread shank so that an end of the needle thread extends from the side of the material opposite the button, winding the needle thread, while said thread end is held against withdrawal from the material, about said thread shank such that superposed layers of thread windings are formed on said thread shank, then forming a stitch of said needle thread in the material, and severing said thread end close to the material.

HARRIETTE M. AVIS,
*Administratrix of the Estate of Samuel W. Avis, Deceased.*